(12) United States Patent
El Hanchi El Amrani et al.

(10) Patent No.: US 12,488,876 B2
(45) Date of Patent: Dec. 2, 2025

(54) EASE OF IMAGE ANNOTATION VIA CURVED PLANAR REFORMATION

(71) Applicant: GE Precision Healthcare LLC, Wauwatosa, WI (US)

(72) Inventors: Faycal El Hanchi El Amrani, Paris (FR); Bassam Abdallah, Versailles (FR); Etienne Perot, Versailles (FR); Caroline Clélia My-Linh Dam Hieu, Paris (FR); Luc Caselles, Orsay (FR); Nicolas Gogin, Chatenay-Malabry (FR)

(73) Assignee: GE Precision Healthcare LLC, Waukesha, WI (US)

( * ) Notice: Subject to any disclaimer, the term of this patent is extended or adjusted under 35 U.S.C. 154(b) by 400 days.

(21) Appl. No.: 18/157,296

(22) Filed: Jan. 20, 2023

(65) Prior Publication Data

US 2024/0249825 A1 Jul. 25, 2024

(51) Int. Cl.
*G06T 15/00* (2011.01)
*G06T 7/66* (2017.01)
*G16H 30/40* (2018.01)

(52) U.S. Cl.
CPC ............. *G16H 30/40* (2018.01); *G06T 7/66* (2017.01); *G06T 15/00* (2013.01);
(Continued)

(58) Field of Classification Search
CPC .. G06V 20/64; G06V 10/82; G06V 2201/031; G06T 7/00; G06T 17/00;
(Continued)

(56) References Cited

U.S. PATENT DOCUMENTS 9,129,417 B2   9/2015 Zheng et al.
2004/0249270 A1* 12/2004 Kondo ............... G06T 7/12
                                                    382/128
(Continued)

FOREIGN PATENT DOCUMENTS

CN        112614217 A  *  4/2021  ............. G06T 17/00

OTHER PUBLICATIONS

Bitter etv al., "CEASAR: a smooth, accurate and robust centerline extraction algorithm," Proceedings Visualization 2000. VIS 2000 (Cat. No. 00CH37145), Salt Lake City, UT, USA, 2000, pp. 45-52, doi: 10.1109/VISUAL.2000.885675.*
(Continued)

*Primary Examiner* — Guillermo M Rivera-Martinez
(74) *Attorney, Agent, or Firm* — Amin, Turocy & Watson, LLP

(57) ABSTRACT

Systems/techniques that facilitate improved ease of image annotation via curved planar reformation are provided. In various embodiments, a system can access a first image depicting an original version of a tubular anatomical structure. In various aspects, the system can generate a second image, by straightening the first image about a centerline of the tubular anatomical structure, such that the second image depicts a straightened version of the tubular anatomical structure. In various instances, the system can generate a third image, by inserting an annotation into the second image, such that the third image depicts the annotation and the straightened version of the tubular anatomical structure. In various cases, the system can generate a fourth image, by un-straightening the third image about the centerline of the tubular anatomical structure, such that the fourth image depicts both the original version of the tubular anatomical structure and an un-straightened version of the annotation.

20 Claims, 19 Drawing Sheets

(52) U.S. Cl.
CPC ............... *G06T 2207/20084* (2013.01); *G06T 2207/30101* (2013.01); *G06T 2207/30172* (2013.01); *G06T 2215/06* (2013.01)

(58) Field of Classification Search
CPC ..................... G06T 15/08; G06T 15/00; G06T 2207/30101; G06T 2207/30028; G06T 2210/41
See application file for complete search history.

(56) References Cited

U.S. PATENT DOCUMENTS

| | | | | |
|---|---|---|---|---|
| 2006/0098007 A1* | 5/2006 | Rouet | ........................ | G06T 7/12 345/419 |
| 2007/0216678 A1* | 9/2007 | Rouet | ................... | G06T 7/0012 345/423 |
| 2010/0002928 A1* | 1/2010 | Durgan | ................... | G06T 19/00 382/132 |
| 2011/0206257 A1* | 8/2011 | Qanadli | .................... | G06T 7/60 382/130 |
| 2012/0026162 A1* | 2/2012 | Masumoto | .............. | G06T 19/00 345/419 |
| 2015/0089337 A1* | 3/2015 | Grady | .................... | G16H 30/40 715/202 |
| 2016/0260214 A1* | 9/2016 | Sakamoto | ............. | G06T 7/0012 |
| 2016/0292818 A1* | 10/2016 | Sakamoto | ............. | G09G 5/373 |
| 2017/0270705 A1* | 9/2017 | Hopfgartner | ........ | A61B 6/5211 |
| 2023/0410291 A1* | 12/2023 | Heitz | .................... | G06T 7/0012 |

OTHER PUBLICATIONS

Kanitsar et al., "CPR—curved planar reformation," IEEE Visualization, 2002. VIS 2002., Boston, MA, USA, 2002, pp. 37-44, doi: 10.1109/VISUAL.2002.1183754.*

Mohan et al., Tubular Surface Segmentation for Extracting Anatomical Structures From Medical Imagery, IEEE Transactions On Medical Imaging, vol. 29, No. 12, Dec. 2010, pp. 1945-1958, doi: 10.1109/TMI.2010.2050896.*

EP application 24151306.8 filed Jan. 11, 2024—extended Search Report issued Jun. 14, 2024; 10 pages.

* cited by examiner

EASE OF IMAGE ANNOTATION VIA CURVED PLANAR REFORMATION

TECHNICAL FIELD

The subject disclosure relates generally to image annotation, and more specifically to improved ease of image annotation via curved planar reformation.

BACKGROUND

A machine learning model can be trained to perform an inferencing task on inputted medical images. Such training can be conducted in a supervised fashion based on annotated medical images that can be treated as ground-truths. When existing techniques are implemented, such annotated medical images can be crafted by a medical professional via user-controlled image editing software. Unfortunately, crafting such annotated medical images according to such existing techniques can be excessively difficult and time-consuming.

Accordingly, systems or techniques that can increase an amount of ease associated with crafting annotated medical images can be considered as desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate improved ease of image annotation via curved planar reformation are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a first three-dimensional medical image depicting an original version of a tubular anatomical structure. In various aspects, the computer-executable components can comprise a reformatting component that can generate a second three-dimensional medical image, by straightening the first three-dimensional medical image about a centerline of the tubular anatomical structure, such that the second three-dimensional medical image depicts a straightened version of the tubular anatomical structure rather than the original version of the tubular anatomical structure. In various instances, the computer-executable components can comprise an annotation component that can generate a third three-dimensional medical image, by inserting an annotation into the second three-dimensional medical image, such that the third three-dimensional medical image depicts the annotation and the straightened version of the tubular anatomical structure. In various cases, the computer-executable components can comprise an inverse reformatting component that can generate a fourth three-dimensional medical image, by un-straightening the third three-dimensional medical image about the centerline of the tubular anatomical structure, such that the fourth three-dimensional medical image depicts both the original version of the tubular anatomical structure and an un-straightened version of the annotation.

According to one or more embodiments described herein, a computer-implemented method is provided. In various embodiments, the computer-implemented method can comprise accessing, by a device operatively coupled to a processor, a first three-dimensional medical image depicting an original version of a tubular anatomical structure. In various aspects, the computer-implemented method can comprise generating, by the device, a second three-dimensional medical image, by straightening the first three-dimensional medical image about a centerline of the tubular anatomical structure, such that the second three-dimensional medical image depicts a straightened version of the tubular anatomical structure rather than the original version of the tubular anatomical structure. In various instances, the computer-implemented method can comprise generating, by the device, a third three-dimensional medical image, by inserting an annotation into the second three-dimensional medical image, such that the third three-dimensional medical image depicts the annotation and the straightened version of the tubular anatomical structure. In various cases, the computer-implemented method can comprise generating, by the device, a fourth three-dimensional medical image, by un-straightening the third three-dimensional medical image about the centerline of the tubular anatomical structure, such that the fourth three-dimensional medical image depicts both the original version of the tubular anatomical structure and an un-straightened version of the annotation.

According to one or more embodiments, a computer program product for facilitating improved ease of image annotation via curved planar reformation is provided. In various embodiments, the computer program product can comprise a non-transitory computer-readable memory having program instructions embodied therewith. In various aspects, the program instructions can be executable by a processor to cause the processor to access a medical image depicting a curved anatomical structure. In various instances, the program instructions can be further executable to cause the processor to localize a centerline of the curved anatomical structure. In various cases, the program instructions can be further executable to cause the processor to import the medical image from an original image space to a straightened image space, by applying curved planar reformation based on the localized centerline. In various aspects, the program instructions can be further executable to cause the processor to apply an annotation to the medical image in the straightened image space. In various instances, the program instructions can be further executable to cause the processor to import the medical image and the annotation from the straightened image space to the original image space, by applying an inverse of the curved planar reformation. In various cases, the program instructions can be further executable to cause the processor to render the medical image and the annotation in the original image space on an electronic display.

DETAILED DESCRIPTION

Figure 1:
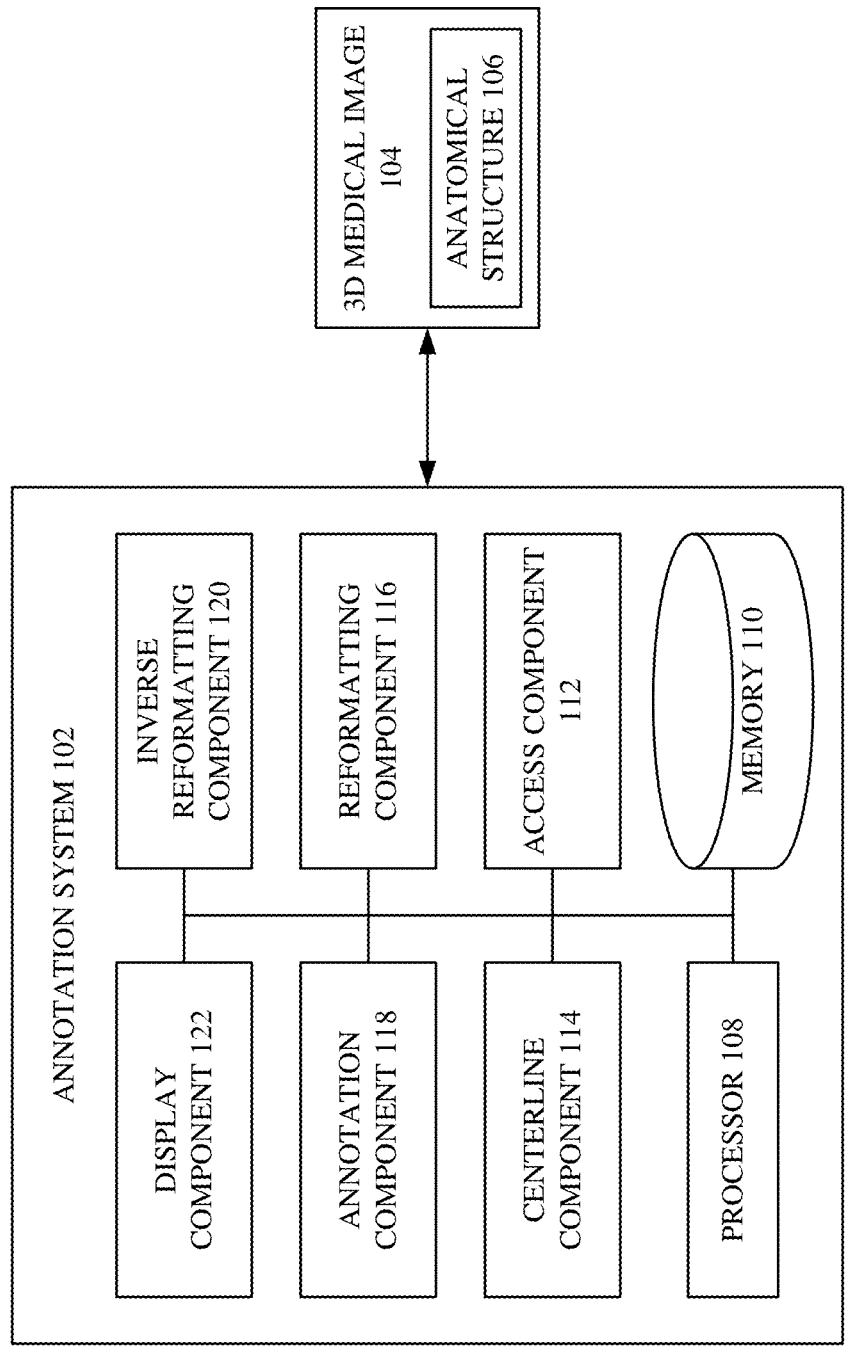
FIG. 1 illustrates a block diagram of an example, non-limiting system that facilitates improved ease of image annotation via curved planar reformation in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A machine learning model (e.g., a deep learning neural network) can be trained to perform an inferencing task (e.g., image segmentation, object localization) on inputted medical images (e.g., on computed tomography (CT) scanned images, on magnetic resonance imaging (MRI) scanned images, on positron emission tomography (PET) scanned images, on X-ray scanned images, on ultrasound scanned images).

Such training can be conducted in supervised fashion based on annotated medical images that can be treated as ground-truths. For example, trainable internal parameters (e.g., convolutional kernels, weights, biases) of the machine learning model can be randomly initialized; the machine learning model can be executed on a given training medical image, thereby yielding an inferencing task result (e.g., thereby yielding a predicted segmentation mask for that given training medical image; thereby yielding a predicted localized boundary for a particular object depicted in that given training medical image); an error or loss can be computed between the inferencing task result and a ground-truth annotated medical image (e.g., a ground-truth segmentation mask; a ground-truth localized boundary) that is known or deemed to correspond to the given training medical image; and the trainable internal parameters of the machine learning model can be incrementally updated (e.g., via backpropagation) based on such error or loss. Such supervised training can be iterated (e.g., using any suitable training batch sizes, any suitable objective functions, or any suitable training termination criteria), which can cause the trainable internal parameters of the machine learning model to become iteratively optimized for accurately performing the inferencing task on inputted medical images.

When existing techniques are implemented, the annotated medical images utilized during such supervised training can be crafted by a medical professional via user-controlled image editing software. For example, for any particular training medical image, the medical professional can utilize the user-controlled image editing software to make a copy of the particular training medical image and to insert (e.g., via a brush tool or contour tool of the user-controlled image editing software) an annotation (e.g., a boundary marker, a voxel class) into that copy. Such copy can then be considered as being an annotated ground-truth that is known or deemed to correspond to the given training medical image. Unfortunately, crafting annotated medical images according to such existing techniques can be excessively difficult and time-consuming.

Accordingly, systems or techniques that can increase an amount of ease associated with crafting annotated medical images can be considered as desirable.

Various embodiments described herein can address one or more of these technical problems. One or more embodiments described herein can include systems, computer-implemented methods, apparatus, or computer program products that can facilitate improved ease of image annotation via curved planar reformation. More specifically, the inventors of various embodiments described herein recognized that existing techniques for crafting annotated medical images consume so much time and effort at least in part because such existing techniques involve applying annotations to medical images in the original image spaces of those medical images. In particular, as the present inventors recognized, a medical image can, in its original image space, visually depict anatomical structures that are tubular, meandering, or otherwise physically arranged in intricate, winding layouts. Non-limiting examples of such anatomical structures can include lumens, blood vessels, intestines, or nerve fibers. In any case, applying annotations to such anatomical structures via brush tools or contour tools can be an arduous process that necessitates long periods of sustained effort or concentration by the medical professional crafting the annotations (e.g., the medical professional often must carefully trace the brush tool or the contour tool along the meandering, winding, intricate boundaries of those anatomical structures). As described herein, the present inventors realized that such long periods of sustained effort or concentration can be ameliorated by applying annotations to such medical images not in the original image spaces of those medical images, but instead in straightened image spaces of those medical images. In other words, the present inventors realized that, for any given medical image depicting a tubular, meandering, winding, or otherwise intricate anatomical structure, such given medical image can be straightened (e.g., via curved planar reformation) about a centerline of the anatomical structure, an annotation can be applied (e.g., via brush tools or contour tools) to the straightened version of the given medical image, and, after the annotation is applied, both the straightened version of the given medical image and the applied annotation can be un-straightened (e.g., by an inverse of curved planar reformation), such that an intricate, winding, un-straightened version of the annotation can be depicted in the given medical image. As described herein, and as the present inventors realized, less effort or less concentration on the part of the medical professional can be needed to apply the annotation to the straightened version of the given medical image, as compared to instead applying the annotation to the original, un-straightened version of the given medical image.

Various embodiments described herein can be considered as a computerized tool (e.g., any suitable combination of computer-executable hardware or computer-executable software) that can facilitate improved ease of image annotation via curved planar reformation. In various aspects, such computerized tool can comprise an access component, a centerline component, a reformatting component, an annotation component, an inverse reformatting component, or a display component.

In various embodiments, there can be a first three-dimensional medical image. In various instances, the first three-dimensional medical image can visually depict or illustrate an anatomical structure. In various instances, the anatomical structure can comprise a tubular core and any suitable number of any suitable types of protrusions that can radially branch off from the tubular core. In various cases, the tubular core can exhibit any suitable meandering layout. In other words, the tubular core can extend longitudinally along any suitable winding path throughout the first three-dimensional medical image, where such winding path can exhibit any suitable number of twists, turns, coils, or loops. In various aspects, the tubular core of the anatomical structure can exhibit any suitable cross-sectional shapes, which can be uniform or non-uniform along the longitudinal length of the tubular core. In various instances, the anatomical structure (e.g., the tubular core or any protrusions radially branching off from the tubular core) can be coupled or otherwise attached to any other suitable anatomical structures depicted in the first three-dimensional medical image.

In various aspects, the first three-dimensional medical image can exhibit any suitable number or arrangement of voxels. In various instances, the first three-dimensional medical image can have been generated or otherwise captured via any suitable medical imaging modality (e.g., CT scanner, MRI scanner, PET scanner, X-ray scanner, ultrasound scanner). In various cases, the first three-dimensional medical image can have undergone any suitable type of image reconstruction techniques (e.g., filtered back projection).

In any case, it can be desired to annotate the anatomical structure depicted in the first three-dimensional medical image. However, because the tubular core of the anatomical structure can exhibit a meandering layout, it can require excessive time, effort, or concentration to insert an annotation directly into the first three-dimensional medical image via user-controlled image editing software. In particular, it would be highly difficult for a medical professional to trace a brush tool or a contour tool of such user-controlled image editing software along the twisting, turning, coiling, or looping longitudinal length of the tubular core of the anatomical structure. In various instances, the computerized tool described herein can help to address this problem.

In various embodiments, the access component of the computerized tool can electronically receive or otherwise electronically access the first three-dimensional medical image. In some aspects, the access component can electronically retrieve the first three-dimensional medical image from any suitable centralized or decentralized data structures (e.g., graph data structures, relational data structures, hybrid data structures), whether remote from or local to the access component. In any case, the access component can electronically obtain or access the first three-dimensional medical image, such that other components of the computerized tool can electronically interact with (e.g., read, write, edit, copy, manipulate) the first three-dimensional medical image.

In various embodiments, the centerline component of the computerized tool can electronically localize a centerline of the anatomical structure. In various aspects, the centerline can be considered as a three-dimensional curve (e.g., which can be smooth or not smooth) that can run longitudinally along the tubular core of the anatomical structure, such that the centerline can be considered as delineating, demarcating, or otherwise approximating the location of a radial center of the tubular core at each longitudinal position along the tubular core. In some instances, for any given axial cross-section of the tubular core (which can be distinct from an axial cross-section of the first three-dimensional medical image itself), the centerline can be considered as passing orthogonally through a geometric center of that given axial cross-section.

In various cases, the centerline component can localize the centerline of the anatomical structure via any suitable centerline localization techniques. For example, in some aspects, the centerline component can perform or otherwise execute a CEASAR algorithm (e.g., Smooth, Accurate, and Robust Centerline Extraction Algorithm) on the first three-dimensional medical image, and such performance or execution can identify as output the intra-image location of the centerline of the anatomical structure (e.g., can identify which voxels of the first three-dimensional medical image lie on the centerline). As another example, the centerline component can perform or otherwise execute any suitable centerline extraction technique that is based on a Dijkstra algorithm, and such performance or execution can identify as output the intra-image location of the centerline of the anatomical structure. As even another example, the centerline component can execute on the first three-dimensional medical image a machine learning model (e.g., a deep learning neural network) that has been pre-trained (e.g., via supervised training, unsupervised training, or reinforcement learning) to localize centerlines of anatomical structures depicted in inputted medical images. No matter what centerline extraction technique is implemented, the centerline component can electronically localize the centerline of the anatomical structure.

In various embodiments, the reformatting component of the computerized tool can electronically generate a second three-dimensional medical image, by straightening the first three-dimensional medical image about the centerline of the anatomical structure. More specifically, the reformatting component can electronically perform or otherwise execute curved planar reformation (CPR) on the first three-dimensional medical image, where such CPR can be based on the centerline of the anatomical structure. In various aspects, such performance or execution of CPR can straighten the first three-dimensional medical image about the centerline, and such straightened version of the first three-dimensional medical image can be considered or otherwise treated as the second three-dimensional medical image. In other words, such performance or execution of CPR can reorganize or rearrange the voxels that make up the first three-dimensional medical image, where such reorganized or rearranged voxels can collectively depict or illustrate the tubular core of the anatomical structure as being straight (e.g., as having a non-twisting, non-turning, non-looping, non-coiling centerline) rather than meandering or winding (e.g., rather than having a twisting, turning, looping, or coiling centerline). In such case, those reorganized or rearranged voxels can collectively be considered as the second three-dimensional medical image. Accordingly, the second three-dimensional medical image can be considered as having the same total number of voxels as the first three-dimensional medical image, but the second three-dimensional medical image can be considered as having a different format or size (e.g., different numbers of voxel rows, voxel columns, or voxel layers) than the first three-dimensional medical image. Because the second three-dimensional medical image can be considered as a reorganized or rearranged version of the first three-dimensional medical image, the second three-dimensional medical image can, in some aspects, have or otherwise exhibit various optical distortions that are not present in the first three-dimensional medical image (e.g., various objects depicted in the first three-dimensional medical image can be partially enlarged, shrunk, or otherwise distorted in the second three-dimensional medical image). In any case, the second three-dimensional medical image can be considered as illustrating a straightened version of the anatomical structure.

In various embodiments, the annotation component of the computerized tool can electronically generate a third three-dimensional medical image, by inserting an annotation into the second three-dimensional medical image. In various aspects, the annotation can be any suitable electronic data generated by user-controlled image editing software. For example, the annotation can be a boundary marker or a voxel class that can be created by a brush tool or contour tool of such user-controlled image editing software. In some instances, a medical professional can trace (e.g., via a touchscreen, joystick, or computer mouse) such brush tool or contour tool along a longitudinal length of the straightened version of the anatomical structure. In various cases, tracing such brush tool or contour tool along the longitudinal length of the straightened version of the anatomical structure can be easier than tracing such brush tool or contour tool along the longitudinal length of the original, un-straightened version of the anatomical structure. After all, the original, un-straightened version of the anatomical structure depicted in the first three-dimensional medical image can exhibit a meandering or winding layout filled with intricate twists, turns, loops, or coils, and it can require excessive time or concentration to painstakingly trace a brush tool or contour tool over such intricate twists, turns, loops, or coils. In contrast, the straightened version of the anatomical structure depicted in the second three-dimensional medical image can exhibit a straightened layout that lacks such intricate twists, turns, loops, or coils, and it can thus require less time or concentration to trace a brush tool or contour tool over such straightened layout. In any case, the annotation can be generated by user-controlled image editing software, and the annotation component can insert the annotation into the second three-dimensional medical image and not into the first three-dimensional medical image.

In some aspects, the annotation component can insert the annotation into a given slice (e.g., an axial slice, a longitudinal slice) of the second three-dimensional medical image. In such cases, the annotation component can extend the annotation or any suitable portion thereof to some other slice (e.g., a neighboring axial slice if the given slice is an axial slice, a neighboring longitudinal slice if the given slice is a longitudinal slice) of the second three-dimensional medical image, via any suitable three-dimensional interpolation or extrapolation techniques. For example, various existing automated video annotation techniques utilize three-dimensional interpolation or extrapolation (e.g., analytical interpolation or extrapolation such as contour tracking; or artificial-intelligence-based interpolation or extrapolation) to enable a user-crafted bounding box to be propagated across multiple video frames based on the pixel values of those multiple video frames. In various instances, such three-dimensional interpolation or extrapolation can likewise be implemented to propagate the annotation described herein (e.g., the boundary marker, the voxel class) across multiple slices of the second three-dimensional medical image based on the pixel values of those multiple slices.

In any case, the second three-dimensional medical image as modified by the annotation can be considered or otherwise treated as the third three-dimensional medical image, such that the third three-dimensional medical image can have the same size or format (e.g., same numbers of voxel rows, voxel columns, and voxel layers) as the second three-dimensional medical image. So, the third three-dimensional medical image can depict the straightened version of the anatomical structure and can also depict the annotation.

In various embodiments, the inverse reformatting component of the computerized tool can electronically generate a fourth three-dimensional medical image, by un-straightening the third three-dimensional medical image about the centerline of the anatomical structure. More specifically, the inverse reformatting component can electronically perform or otherwise execute on the third three-dimensional medical image an inverse of CPR. Indeed, CPR can be considered as a bijective (e.g., one-to-one) transformation. Accordingly, because bijective transformations can be invertible (e.g., reversible), the CPR that was performed by the reformatting component can be invertible. Thus, in various aspects, the inverse reformatting component can perform or execute an inverse of such CPR on the third three-dimensional medical image. In various instances, such performance or execution of inverse of CPR can un-straighten the third three-dimensional medical image about the centerline of the anatomical structure, and such un-straightened version of the third three-dimensional medical image can be considered or otherwise treated as the fourth three-dimensional medical image. In other words, such performance or execution of the inverse of CPR can reorganize or rearrange the voxels that make up the third three-dimensional medical image, where such reorganized or rearranged voxels can collectively depict or illustrate the tubular core of the anatomical structure as being in its original, meandering, winding layout rather than in its straightened layout. In such case, those reorganized or rearranged voxels can collectively be considered as the fourth three-dimensional medical image. Accordingly, the fourth three-dimensional medical image can be considered as having the same size or format (e.g., same numbers of voxel rows, voxel columns, and voxel layers) as the first three-dimensional medical image.

Furthermore, because the third three-dimensional medical image can depict or otherwise illustrate the annotation, the performance or execution of the inverse of CPR can cause the fourth three-dimensional medical image to depict or otherwise illustrate an un-straightened (e.g., meandering, winding) version of the annotation. In particular, execution of CPR by the reformatting component can, as described herein, be considered as a transformation that rearranges or reorganizes the voxels of the first three-dimensional medical image so as to straighten out the anatomical structure about its centerline. Conversely, execution of the inverse of CPR by the inverse reformatting component can be considered as an inverse transformation that rearranges or reorganizes the voxels of the third three-dimensional medical image so as to un-straighten the straightened version of the anatomical structure about its centerline. In other words, performing the inverse of CPR can be considered as undoing the voxel rearrangement or reorganization that was facilitated by the performance of CPR. Now, because CPR and its inverse can be considered as transformations that facilitate the rearrangement or reorganization of voxels, and because the voxels of the third three-dimensional medical image can depict or otherwise illustrate the annotation in addition to the straightened version of the anatomical structure, performing the inverse of CPR on the third three-dimensional medical image can affect not just the voxels that make up the straightened version of the anatomical structure, but can also affect the voxels that make up the annotation. Accordingly, not only can the performance of the inverse of CPR on the third three-dimensional medical image cause the straightened version of the anatomical to become un-straightened (e.g., to revert back to its original, meandering, winding layout), but such performance of the inverse of CPR can also cause the annotation to become un-straightened (e.g., to now exhibit a meandering, winding layout).

In other words, the fourth three-dimensional medical image can be considered as illustrating the original, un-straightened version of the anatomical structure and also as illustrating an un-straightened version of the annotation. That is, the fourth three-dimensional medical image can be considered as an annotated version of the first three-dimensional medical image. Note that it would have been highly difficult (e.g., time-consuming, effort-intensive, painstaking) to create the un-straightened version of the annotation by using a brush tool or a contour tool directly in the first three-dimensional medical image (e.g., again, it would have required much time and concentration to trace the brush tool or the contour tool over or along the meandering, winding, twisting, turning length of the original, un-straightened version of the anatomical structure). In stark contrast, it can have been much less difficult to create the annotation by using a brush tool or a contour tool on the second three-dimensional medical image (e.g., again, it can have required less time and concentration to trace the brush tool or the contour tool over or along the non-meandering, non-winding, non-twisting, non-turning length of the straightened version of the anatomical structure). Accordingly, by first straightening the anatomical structure about its centerline, applying the annotation to the straightened version of the anatomical structure, and subsequently un-straightening both the annotation and the straightened version of the anatomical structure about its centerline, an amount of annotation time, effort, concentration, or difficulty can be reduced.

In various embodiments, the display component of the computerized tool can electronically render, on any suitable electronic display (e.g., computer screen, computer monitor, graphical user-interface), the fourth three-dimensional medical image or any suitable two-dimensional slice or projection thereof. Likewise, in various aspects, the display component can electronically render on the electronic display the third three-dimensional medical image or any suitable two-dimensional slice or projection thereof. In various instances, the display component can electronically transmit the third three-dimensional medical image, the fourth three-dimensional medical, or any suitable two-dimensional slices or projections thereof to any other suitable computing devices.

Because the fourth three-dimensional medical image can be considered as an annotated version of the first three-dimensional medical image, the fourth three-dimensional medical image can be implemented or otherwise utilized during training of any suitable machine learning model as a ground-truth that is known or deemed to correspond to the first three-dimensional medical image.

Various embodiments described herein can be employed to use hardware or software to solve problems that are highly technical in nature (e.g., to facilitate improved ease of image annotation via curved planar reformation), that are not abstract and that cannot be performed as a set of mental acts by a human. Further, some of the processes performed can be performed by a specialized computer for carrying out defined acts related to improved ease of image annotation via curved planar reformation. For example, such defined acts can include accessing, by a device operatively coupled to a processor, a first three-dimensional medical image depicting an original version of a tubular anatomical structure; generating, by the device, a second three-dimensional medical image, by straightening the first three-dimensional medical image about a centerline of the tubular anatomical structure, such that the second three-dimensional medical image depicts a straightened version of the tubular anatomical structure rather than the original version of the tubular anatomical structure; generating, by the device, a third three-dimensional medical image, by inserting an annotation into the second three-dimensional medical image, such that the third three-dimensional medical image depicts the annotation and the straightened version of the tubular anatomical structure; and generating, by the device, a fourth three-dimensional medical image, by un-straightening the third three-dimensional medical image about the centerline of the tubular anatomical structure, such that the fourth three-dimensional medical image depicts both the original version of the tubular anatomical structure and an un-straightened version of the annotation.

Such defined acts are not performed manually by humans. Indeed, neither the human mind nor a human with pen and paper can electronically access a medical image (e.g., a CT scanned image, an MRI scanned image, an X-ray scanned image) illustrating a meandering anatomical structure, electronically straighten (e.g., via CPR) the medical image about a centerline of the meandering anatomical structure, electronically insert an annotation (e.g., boundary marker, voxel class) into the straightened version of the medical image, and electronically un-straighten (e.g., via an inverse of CPR) the straightened and annotated version of the medical image. Indeed, medical images are inherently computerized constructs that are generated or captured by electronic medical hardware (e.g., CT scanners, MRI scanners, X-ray scanners, PET scanners, ultrasound scanners) and not in any way by the human mind without computers. Similarly, image straightening techniques such as CPR are inherently computerized processes for rearranging or reorganizing the voxels of a medical image (e.g., the human mind, even with the assistance of pen and paper, cannot rearrange or reorganize voxels in any reasonable or meaningful sense). Accordingly, a computerized tool that can straighten a medical image, apply an annotation to the straightened version of the medical image, and un-straighten the straightened and annotated version of the medical image is likewise inherently-computerized and cannot be implemented in any sensible, practical, or reasonable way without computers.

Moreover, various embodiments described herein can integrate into a practical application various teachings relating to improved ease of image annotation via curved planar reformation. As explained above, it can be difficult, time-consuming, and effort-intensive to create an annotation via user-controlled image editing software for a medical image that depicts a tubular, meandering, winding anatomical structure. After all, it can require excessive concentration and time for a medical professional to carefully or painstakingly trace a brush tool or contour tool along, around, or about a twisting, turning, coiling, looping longitudinal length of such a tubular, meandering, winding anatomical structure. Various embodiments described herein can address one or more of these technical problems. Indeed, the present inventors realized that it can be less difficult, less time-consuming, and less effort-intensive to create an annotation via user-controlled image editing software when a medical image that depicts a tubular, meandering, winding anatomical structure has first been straightened, via CPR, about a centerline of that tubular, meandering, winding anatomical structure. In other words, the medical image can be straightened about the centerline, the annotation can be applied (e.g., via a brush tool or contour tool) to the straightened version of the medical image (e.g., not to the original, un-straightened version of the medical image), and the straightened and annotated version of the medical image can then be un-straightened back to its original format. Tracing a brush tool or contour tool along, around, or about a straightened version of a tubular, meandering, winding anatomical structure can be less difficult than tracing the brush tool or contour tool along, around, or about the original version of the tubular, meandering, winding anatomical structure. Accordingly, various embodiments described herein can decrease an amount of time, effort, or difficulty associated with annotating medical images.

Furthermore, in some cases, an annotation can be created (e.g., via a brush tool or contour tool) in a first slice of a medical image, and such annotation can be propagated to other slices of the medical image via three-dimensional interpolation or extrapolation. As the present inventors realized, three-dimensional interpolation or extrapolation can be more accurately, more precisely, or more reliably performed with respect to a straightened version of a tubular, meandering, winding anatomical structure, than with respect to the tubular, meandering, winding anatomical structure directly. In particular, the straightened version of the tubular, meandering, winding anatomical structure can be considered as varying more predictably, more regularly, or less chaotically across image slices, which can increase an efficacy of three-dimensional interpolation or extrapolation. In stark contrast, the original version of the tubular, meandering, winding anatomical structure can be considered as varying less predictably, less regularly, or more chaotically across image slices, which can reduce an efficacy of three-dimensional interpolation or extrapolation. Accordingly, not only can various embodiments described herein reduce an amount of difficulty associated with creating annotated medical images, but various embodiments described herein can also increase a level of accuracy, precision, or reliability of three-dimensional interpolation or extrapolation which can be leveraged during creation of such annotated medical images.

Accordingly, various embodiments described herein certainly constitute concrete and tangible technical improvements in the field of image annotation, and thus such embodiments clearly qualify as useful and practical applications of computers.

Furthermore, various embodiments described herein can control real-world tangible devices based on the disclosed teachings. For example, various embodiments described herein can electronically annotate or otherwise manipulate real-world medical images (e.g., CT images, MRI images, X-ray images, PET images, ultrasound images), and can electronically render such annotated or otherwise manipulated real-world medical images on real-world computer screens.

It should be appreciated that the herein figures and description provide non-limiting examples of various embodiments and are not necessarily drawn to scale.

FIG. 1 illustrates a block diagram of an example, non-limiting system 100 that can facilitate improved ease of image annotation via curved planar reformation in accordance with one or more embodiments described herein. As shown, an annotation system 102 can be electronically integrated, via any suitable wired or wireless electronic connection, with a 3D medical image 104.

In various embodiments, the 3D medical image 104 can be an x-by-y-by-z array of voxels, for any suitable positive integers x, y, and z. In other words, the 3D medical image 104 can be a three-dimensional voxel array having any suitable size or format, hence the term "3D".

In various aspects, the 3D medical image 104 can be generated or otherwise captured by any suitable medical imaging device, medical imaging equipment, or medical imaging modality (not shown). As a non-limiting example, the 3D medical image 104 can be generated or otherwise captured by a CT scanner, in which case the 3D medical image 104 can be considered as a CT scanned image. As another non-limiting example, the 3D medical image 104 can be generated or otherwise captured by an MRI scanner, in which case the 3D medical image 104 can be considered as an MRI scanned image. As yet another non-limiting example, the 3D medical image 104 can be generated or otherwise captured by a PET scanner, in which case the 3D medical image 104 can be considered as a PET scanned image. As still another non-limiting example, the 3D medical image 104 can be generated or otherwise captured by an X-ray scanner, in which case the 3D medical image 104 can be considered as an X-ray scanned image. As even another non-limiting example, the 3D medical image 104 can be generated or otherwise captured by an ultrasound scanner, in which case the 3D medical image 104 can be considered as an ultrasound scanned image. Moreover, the 3D medical image 104 can have undergone any suitable image reconstruction techniques, such as filtered back projection.

In any case, the 3D medical image 104 can visually depict or illustrate an anatomical structure 106. In various aspects, the anatomical structure 106 can be a tubular tissue or organ (or any suitable portion thereof) of any suitable medical patient (e.g., human, animal, or otherwise) and can exhibit a meandering, winding, twisting, turning, coiling, or otherwise looping layout. A non-limiting example for purposes of illustration is shown in FIG. 2.

Figure 2:
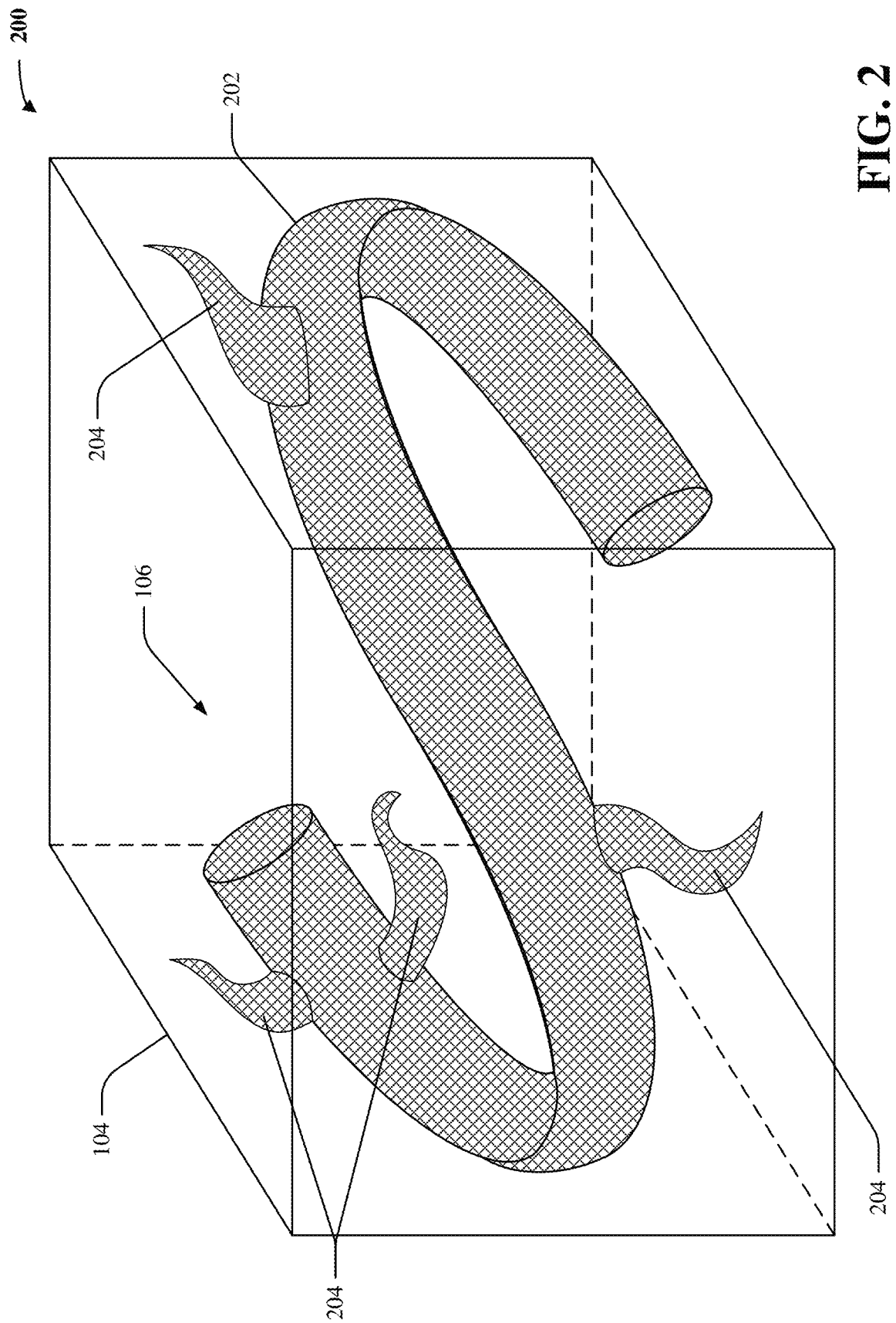
FIG. 2 illustrates an example, non-limiting block diagram showing a tubular anatomical structure in accordance with one or more embodiments described herein.

FIG. 2 illustrates an example, non-limiting block diagram 200 showing a non-limiting embodiment of the 3D medical image 104 and of the anatomical structure 106 in accordance with one or more embodiments described herein.

As shown, the anatomical structure 106 can comprise a tubular core 202. As also shown, the anatomical structure 106 can, in various aspects, comprise one or more protrusions 204 that can branch radially outward from the tubular core 202. In various instances, the tubular core 202 can be composed of any suitable organic tissues or materials of the medical patient. Likewise, the one or more protrusions 204 can be composed of any suitable organic tissues or materials of the medical patient. In some cases, the tubular core 202 or the one or more protrusions 204 can be composed of any suitable inorganic materials (e.g., can be prosthetic implants).

In various aspects, as shown, the tubular core 202 can be considered as meandering, winding, coiling, or looping. In other words, the tubular core 202 can extend longitudinally along any suitable three-dimensional path throughout the 3D medical image 104, where such three-dimensional path can have one or more twists (e.g., rotations of any suitable degrees about a longitudinal axis of the tubular core 202) or one or more turns (e.g., bends in the longitudinal axis of the tubular core 202 of any suitable degrees and toward any suitable directions).

In various instances, the tubular core 202 can exhibit any suitable cross-sectional shape. For ease of illustration, the non-limiting example of FIG. 2 depicts the tubular core 202 as having an elliptical or circular cross-sectional shape. Although FIG. 2 shows the tubular core 202 as having a cross-section that is uniform in both shape and size along its longitudinal length, this is a mere non-limiting example for ease of illustration. In various cases, the cross-section of the tubular core 202 can vary, in shape or size, along the longitudinal length of the tubular core 202. Likewise, the one or more protrusions 204 can exhibit any suitable sizes or shapes of cross-sections, which can be uniform or non-uniform along their respective lengths.

As shown, the tubular core 202 can, in various aspects, be non-hollow (e.g., can have a solid interior). However, this is a mere non-limiting example for ease of illustration. In various instances, the tubular core 202 can be hollow or partially hollow. In such cases, such hollows or partial hollows can be empty or can be filled with any suitable materials, tissues, organs, or bodily fluids of the medical patient.

Although not explicitly shown in FIG. 2 for ease of illustration, the tubular core 202 or any of the one or more protrusions 204 can be coupled, attached, or otherwise adjacent to any other suitable anatomical structures (e.g., tissues, organs, portions thereof) or bodily fluids of the medical patient.

As a non-limiting example, the anatomical structure 106 can be a blood vessel of the medical patient. In such case, the tubular core 202 can be considered as being a primary channel of the blood vessel, and the one or more protrusions 204 can be considered as being secondary or ancillary channels of the blood vessel that branch off from the primary channel. As another non-limiting example, the anatomical structure 106 can be a nerve of the medical patient. In such case, the tubular core 202 can be considered as being a primary fiber of the nerve, and the one or more protrusions 204 can be considered as being secondary or ancillary fibers of the nerve that branch off from the primary fiber. As yet another non-limiting example, the anatomical structure 106 can be an intestine of the medical patient. In such case, the tubular core 202 can be considered as being a primary channel of the intestine, and the one or more protrusions 204 can be considered as being mesentery sinews that hold the primary channel of the intestine in place. In various aspects, the anatomical structure 106 can be any other suitable tubular, meandering, winding anatomical structure of the medical patient, such as a lumen.

Referring back to FIG. 1, it can be desired to create an annotated version of the 3D medical image 104. In various aspects, the annotation system 102 can facilitate such annotation.

In various embodiments, the annotation system 102 can comprise a processor 108 (e.g., computer processing unit, microprocessor) and a non-transitory computer-readable memory 110 that is operably or operatively or communicatively connected or coupled to the processor 108. The non-transitory computer-readable memory 110 can store computer-executable instructions which, upon execution by the processor 108, can cause the processor 108 or other components of the annotation system 102 (e.g., access component 112, centerline component 114, reformatting component 116, annotation component 118, inverse reformatting component 120, display component 122) to perform one or more acts. In various embodiments, the non-transitory computer-readable memory 110 can store computer-executable components (e.g., access component 112, centerline component 114, reformatting component 116, annotation component 118, inverse reformatting component 120, display component 122), and the processor 108 can execute the computer-executable components.

In various embodiments, the annotation system 102 can comprise an access component 112. In various aspects, the access component 112 can electronically receive or otherwise electronically access the 3D medical image 104. In various instances, the access component 112 can electronically retrieve the 3D medical image 104 from any suitable centralized or decentralized data structures (not shown) or from any suitable centralized or decentralized computing devices (not shown). As a non-limiting example, whatever medical imaging device, equipment, or modality (e.g., CT scanner, MRI scanner, X-ray scanner, PET scanner, ultrasound scanner) that generated or captured the 3D medical image 104 can transmit the 3D medical image 104 to the access component 112. In any case, the access component 112 can electronically obtain or access the 3D medical image 104, such that other components of the annotation system 102 can electronically interact with the 3D medical image 104.

In various embodiments, the annotation system 102 can comprise a centerline component 114. In various aspects, as described herein, the centerline component 114 can electronically localize a centerline of the anatomical structure 106.

In various embodiments, the annotation system 102 can comprise a reformatting component 116. In various instances, as described herein, the reformatting component 116 can electronically straighten the 3D medical image 104 about the localized centerline.

In various embodiments, the annotation system 102 can comprise an annotation component 118. In various cases, as described herein, the annotation component 118 can electronically insert an annotation into the straightened version of the 3D medical image 104.

In various embodiments, the annotation system 102 can comprise an inverse reformatting component 120. In various aspects, as described herein, the inverse reformatting component 120 can electronically un-straighten the straightened and annotated version of the 3D medical image 104.

In various embodiments, the annotation system 102 can comprise a display component 122. In various instances, as described herein, the display component 122 can electronically render the un-straightened and annotated version of the 3D medical image 104 on any suitable electronic display.

Figure 3:
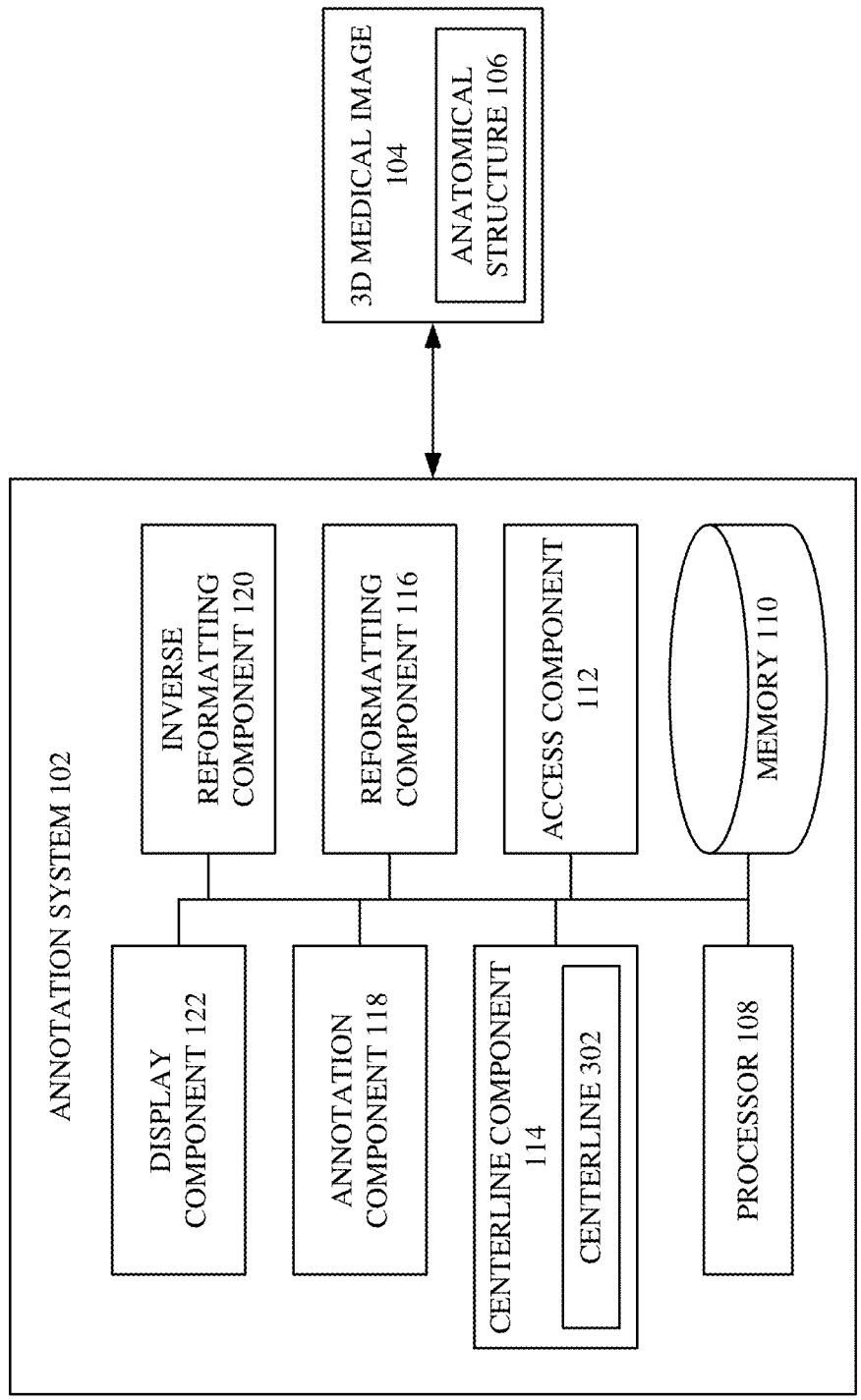
FIG. 3 illustrates a block diagram of an example, non-limiting system including a centerline that facilitates improved ease of image annotation via curved planar reformation in accordance with one or more embodiments described herein.

FIG. 3 illustrates a block diagram of an example, non-limiting system 300 including a centerline that can facilitate improved ease of image annotation via curved planar reformation in accordance with one or more embodiments described herein. As shown, the system 300 can, in some cases, comprise the same components as the system 100, and can further comprise a centerline 302.

In various embodiments, the centerline component 114 can electronically localize the centerline 302 by analyzing or otherwise processing the 3D medical image 104. In various aspects, the centerline 302 can be any suitable three-dimensional curve that be considered as defining, delineating, demarcating, or otherwise representing an approximate location of a center of the anatomical structure 106. A non-limiting example is illustrated in FIG. 4.

Figure 4:
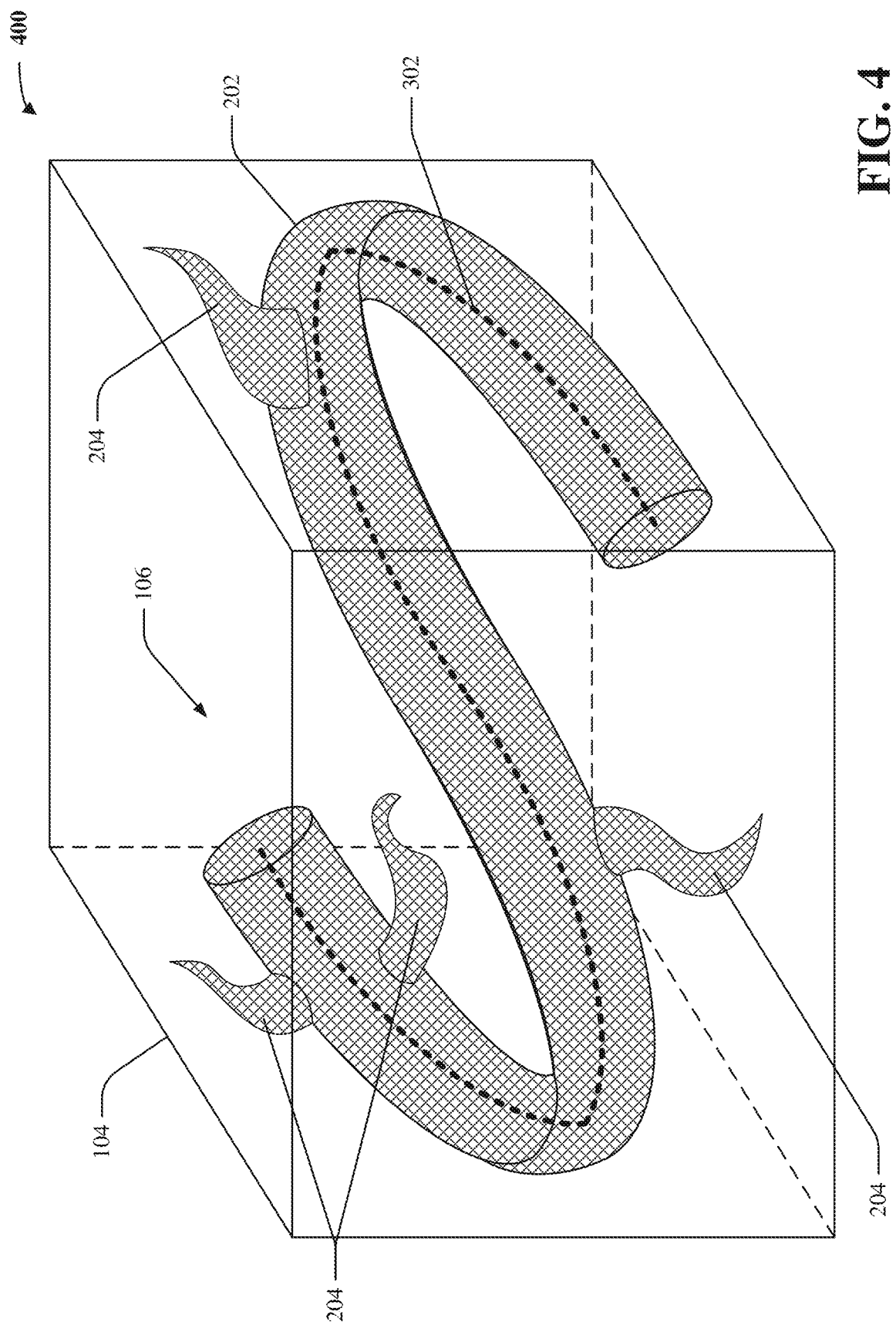
FIG. 4 illustrates an example, non-limiting block diagram showing a centerline of a tubular anatomical structure in accordance with one or more embodiments described herein.

FIG. 4 illustrates an example, non-limiting block diagram 400 showing the centerline 302 of the anatomical structure 106 in accordance with one or more embodiments described herein.

As shown, the centerline 302 can be considered as being a three-dimensional curve that indicates or otherwise represents where the radial center of the tubular core 202 is located at each longitudinal position along the length of the tubular core 202. In still other words, the centerline 302 can be considered as representing or approximating the longitudinal axis of the tubular core 202. Because the tubular core 202 can be meandering or winding (e.g., can exhibit one or more twists, turns, coils, or loops), the centerline 302 can likewise be meandering or winding (e.g., can exhibit those same twists, turns, coils, or loops).

In various instances, the centerline 302 can be expressed in any suitable electronic format. As a non-limiting example, the centerline 302 can be expressed or otherwise formatted as a parametrically-defined three-dimensional curve that is measured with respect to an origin of the 3D medical image 104. As another non-limiting example, the centerline 302 can be expressed or otherwise formatted as a sequence (e.g., an ordered set) of three-dimensional point-coordinates within the 3D medical image 104 that lie on the centerline 302.

In any case, by localizing the centerline 302, the centerline component 114 can determine which voxels of the 3D medical image 104 lie on, make up, or are otherwise associated with the centerline 302.

In various aspects, the centerline component 114 can electronically localize the centerline 302 by implementing, applying, or otherwise executing any suitable centerline extraction technique on the 3D medical image 104. As a non-limiting example, the centerline component 114 can, in various instances, implement, apply, or otherwise execute a CEASAR algorithm on the 3D medical image 104. Such CEASAR algorithm can be considered as an analytical technique for localizing a centerline of a structure depicted in an image. As another non-limiting example, the centerline component 114 can, in various cases, implement, apply, or otherwise execute a Dijkstra algorithm on the 3D medical image 104. Just as above, such Dijkstra algorithm can be considered as an analytical technique (or at least a constituent part of an analytical technique) for localizing a centerline of a structure depicted in an image. As even another non-limiting example, the centerline component 114 can, in various aspects, execute any suitable machine learning model (e.g., deep learning neural network) that has been pre-trained (e.g., in supervised fashion, in unsupervised fashion, or via reinforcement learning) to localize centerlines of particular structures (e.g., the anatomical structure 106) depicted in inputted images. In any case, the centerline component 114 can localize the centerline 302 by performing or otherwise executing any suitable centerline extraction technique on the 3D medical image 104.

Figure 5:
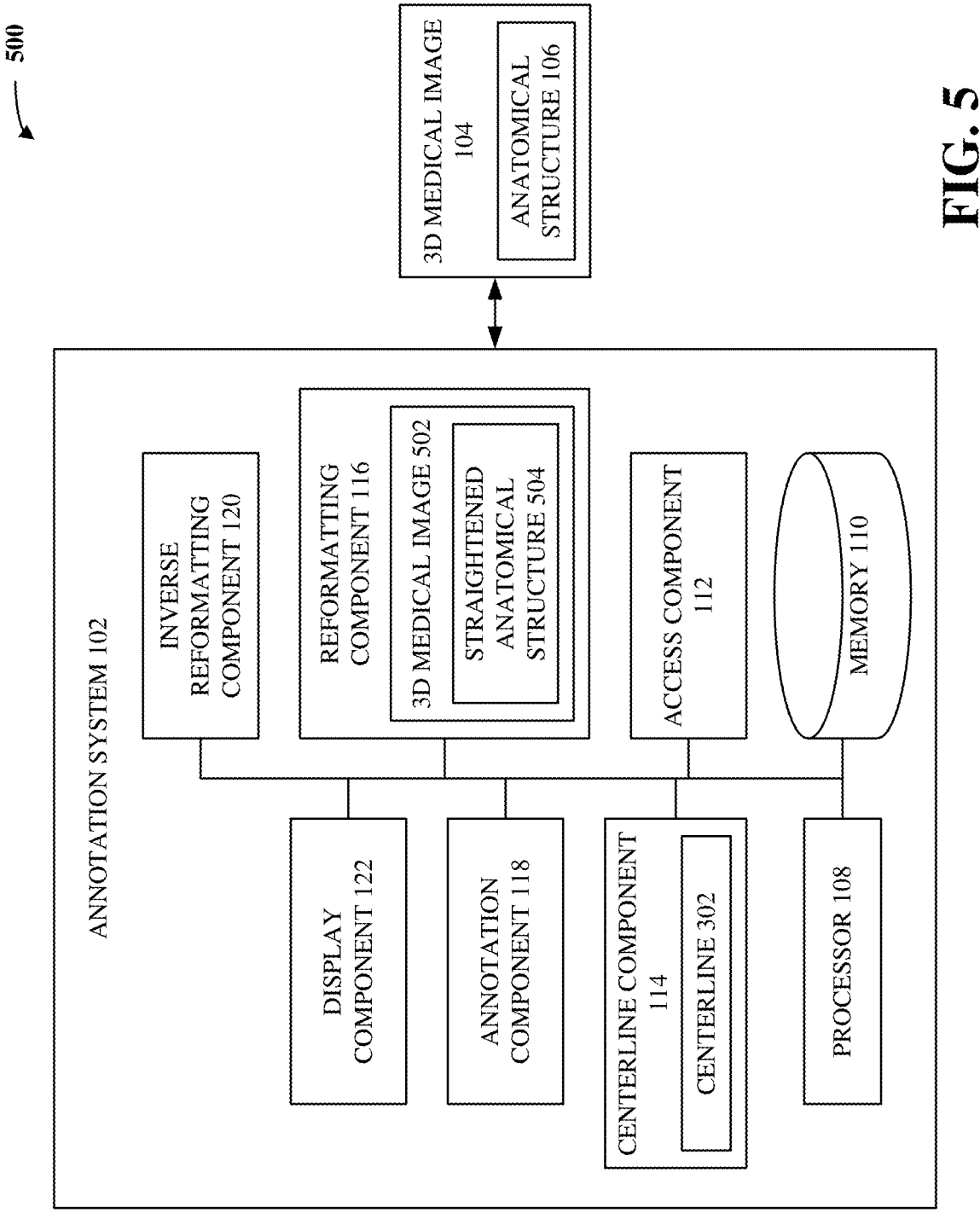
FIG. 5 illustrates a block diagram of an example, non-limiting system including a straightened medical image that facilitates improved ease of image annotation via curved planar reformation in accordance with one or more embodiments described herein.

FIG. 5 illustrates a block diagram of an example, non-limiting system 500 including a straightened medical image that can facilitate improved ease of image annotation via curved planar reformation in accordance with one or more embodiments described herein. As shown, the system 500 can, in some cases, comprise the same components as the system 300, and can further comprise a 3D medical image 502 depicting a straightened anatomical structure 504.

In various embodiments, the reformatting component 116 can electronically generate the 3D medical image 502, based on the 3D medical image 104 and based on the centerline 302. More specifically, the reformatting component 116 can electronically straighten the 3D medical image 104 about the centerline 302, and the result of such straightening can be considered as the 3D medical image 502. Various non-limiting aspects are further described with respect to FIGS. 6-7.

Figure 6:
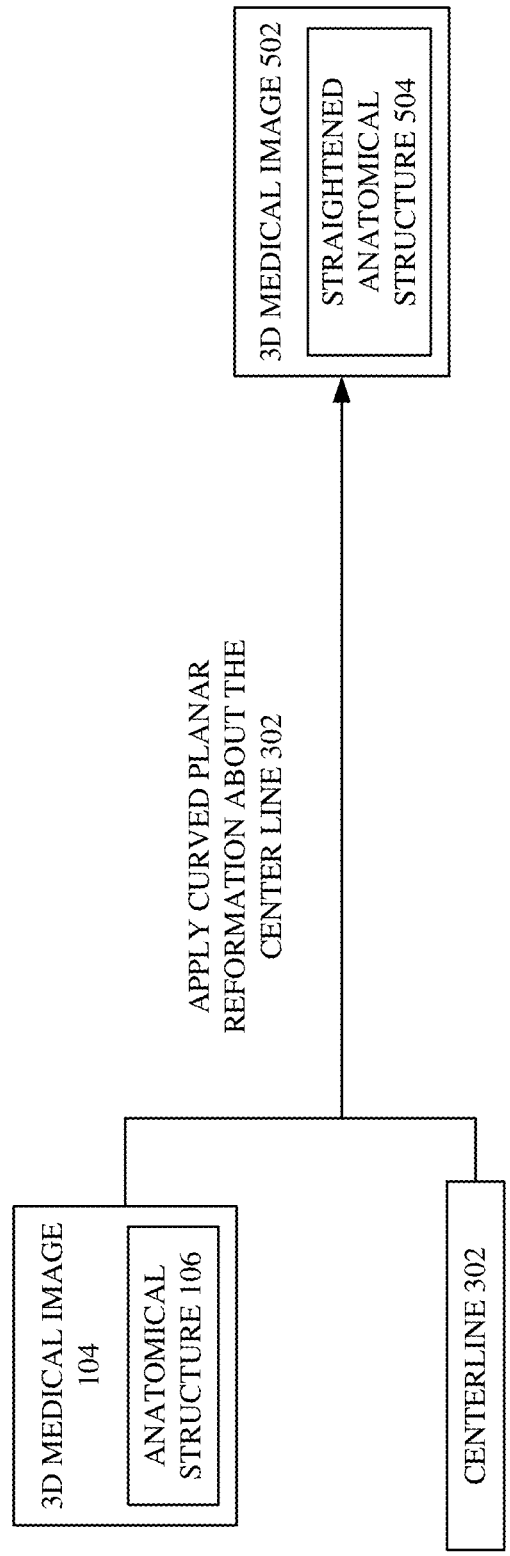
FIG. 6 illustrates an example, non-limiting block diagram showing how a medical image can be straightened in accordance with one or more embodiments described herein.

FIG. 6 illustrates an example, non-limiting block diagram 600 showing how the 3D medical image 104 can be straightened in accordance with one or more embodiments described herein.

In various embodiments, as shown, the reformatting component 116 can generate the 3D medical image 502, by applying curved planar reformation (CPR) to the 3D medical image 104, where such CPR can be based on the centerline 302. More specifically, CPR, as mentioned above, can be considered as a bijective transformation for spatially reformatting, rearranging, or otherwise reorganizing the voxels of a medical image, so that the medical image can appear to have been straightened about some reference curve. In various aspects, that reference curve can be the centerline 302. In such case, when the reformatting component 116 applies CPR to the 3D medical image 104, the reformatting component 116 can be considered as straightening the 3D medical image 104 about the centerline 302. In other words, the reformatting component 116 can be considered as spatially restructuring the voxels of the 3D medical image 104, such that the centerline 302 is no longer meandering or winding (e.g., no longer exhibits twists, turns, coils, or loops). Thus, because the centerline 302 can be considered demarcating the three-dimensional path along which the anatomical structure 106 (e.g., the tubular core 202) longitudinally extends, application of CPR to the 3D medical image 104 about the centerline 302 can commensurately cause the anatomical structure 106 to no longer be meandering or winding (e.g., to no longer exhibit twists, turns, coils, or loops). Accordingly, application of CPR to the 3D medical image 104 about the centerline 302 can be considered as yielding a straightened version of the 3D medical image 104 which can depict a straightened version of the anatomical structure 106. In various cases, such straightened version of the 3D medical image 104 can be referred to as the 3D medical image 502, and such straightened version of the anatomical structure 106 can be referred to as the straightened anatomical structure 504. Various non-limiting aspects are described with respect to FIG. 7.

Figure 7:
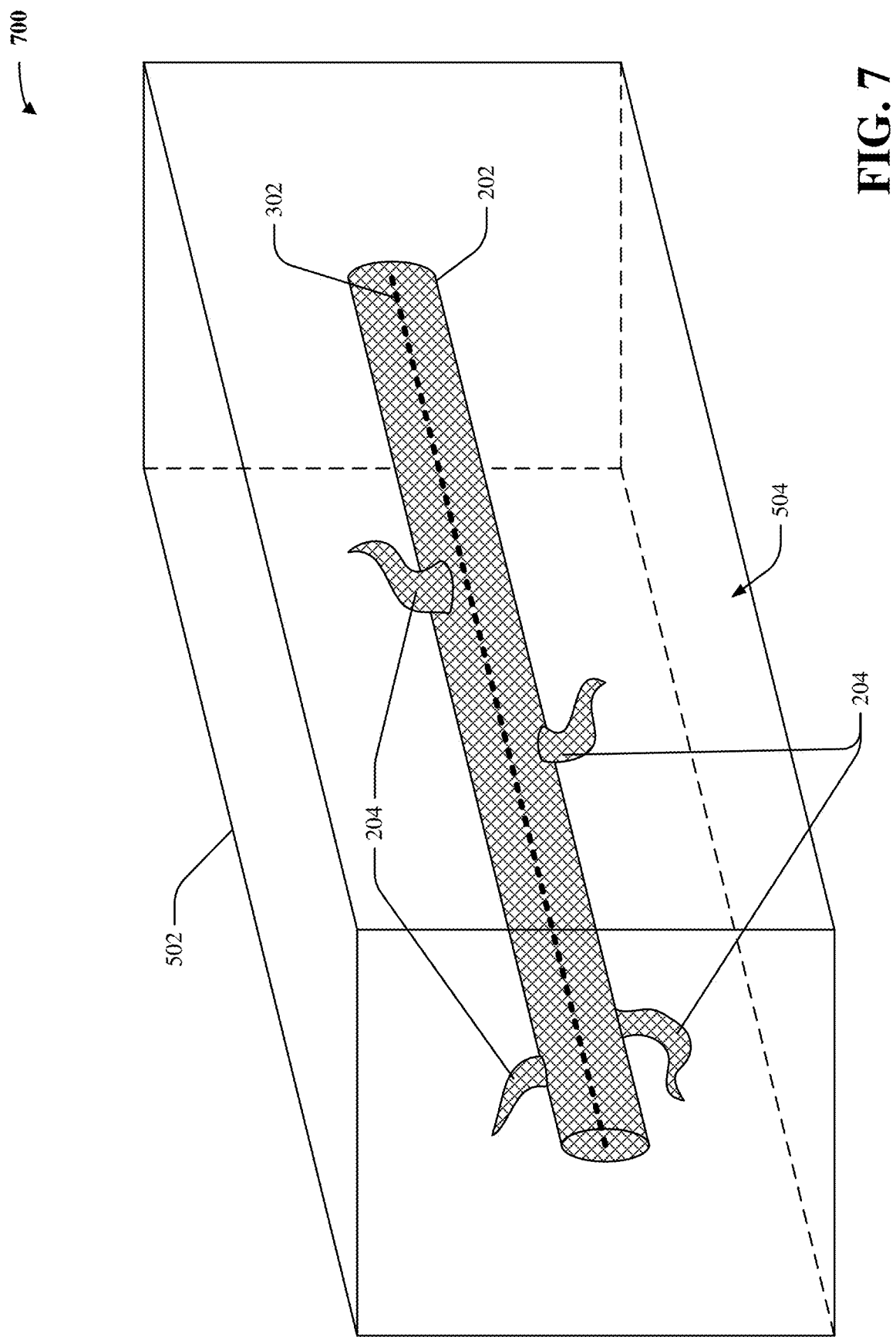
FIG. 7 illustrates an example, non-limiting block diagram showing a straightened tubular anatomical structure in accordance with one or more embodiments described herein.

FIG. 7 illustrates an example, non-limiting block diagram 700 showing a straightened tubular anatomical structure in accordance with one or more embodiments described herein. In other words, FIG. 7 depicts a non-limiting example of the 3D medical image 502 and of the straightened anatomical structure 504.

As can be seen, the straightened anatomical structure 504 can, like the anatomical structure 106, comprise the tubular core 202 and the one or more protrusions 204, where the centerline 302 can be considered as demarcating the three-dimensional path along which the tubular core 202 longitudinally extends. However, as shown, application of CPR can cause the centerline 302 to no longer be meandering or winding. Instead, as shown, application of CPR can cause the centerline 302 to be straight (e.g., to be non-meandering, non-winding, non-twisting, non-turning, non-coiling, non-looping). In other words, application of CPR to the 3D medical image 104 can have caused the voxels of the 3D medical image 104 to have been moved into a new spatial arrangement, which new spatial arrangement can illustrate the centerline 302 as being straight instead of meandering or winding. Accordingly, because the centerline 302 can demarcate the three-dimensional path along which the tubular core 202 longitudinally extends, such new spatial arrangement can likewise illustrate the tubular core 202 as now being straight instead of meandering or winding. For at least these reasons, the 3D medical image 502 can be considered as a reformatted, rearranged, reorganized, or straightened version of the 3D medical image 104, and the straightened anatomical structure 504 can likewise be considered as a reformatted, rearranged, reorganized, or straightened version of the anatomical structure 106.

Note that, because CPR can be considered as a bijective transformation that spatially rearranges or reorganizes the voxels of the 3D medical image 104, the 3D medical image 502 can have a same total number of voxels as the 3D medical image 104, but the 3D medical image 502 can have a different size or format (e.g., different numbers of voxel rows, voxel columns, or voxel layers) than the 3D medical image 104. As a non-limiting, and as mentioned above, the 3D medical image 104 can be an x-by-y-by-z array of voxels. In such case, the 3D medical image 502 can be an x'-by-y'-by-z' array of voxels, for any suitable positive integers x', y', and z', where x'y'z'=xyz, but where: x' can be equal or unequal to x; y' can be equal or unequal to y; and z' can be equal or unequal to z.

Furthermore, note that the 3D medical image 502 can, in some cases, comprise any suitable optical distortions that may not be present in the 3D medical image 104. After all, the 3D medical image 502 can be considered as a spatially rearranged or reorganized version of the 3D medical image 104. Accordingly, any suitable objects or structures (which may or may not include the tubular core 202 or the one or more protrusions 204) that are depicted in the 3D medical image 104 can exhibit certain characteristics (e.g., certain sizes, certain shapes, certain relative dimensions), but those same objects or structures as depicted in the 3D medical image 502 can exhibit different characteristics (e.g., different sizes, different shapes, different relative dimensions). In other words, application of CPR can cause any of such objects or structures to become wholly or partially enlarged, wholly or partially shrunk, or otherwise wholly or partially distorted. But despite such potential distortions, application of CPR can nevertheless cause the centerline 302, and thus the anatomical structure 106, to become straightened (e.g., to no longer extend longitudinally in a twisting, turning, coiling, or looping manner).

Figure 8:
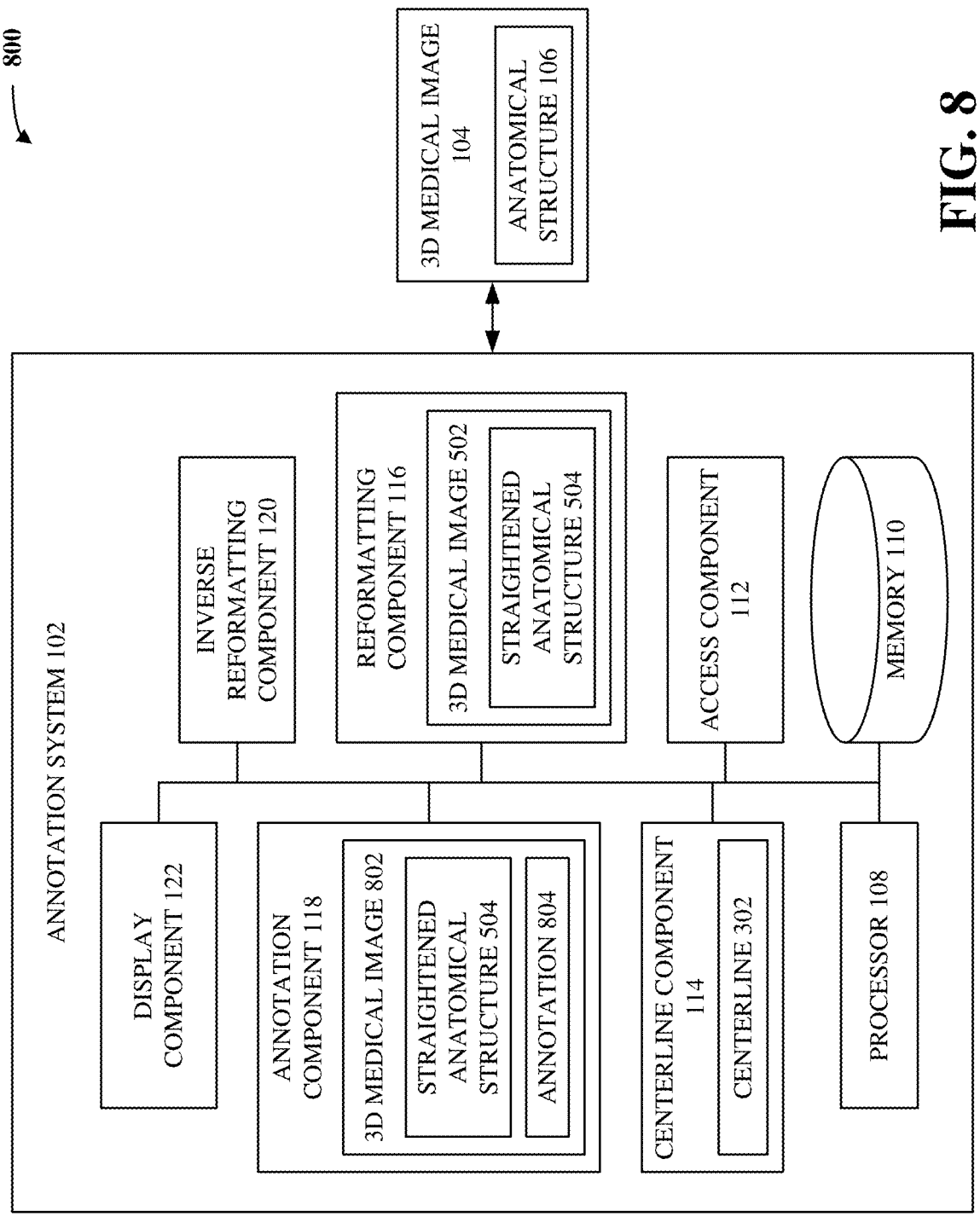
FIG. 8 illustrates a block diagram of an example, non-limiting system including an annotated and straightened medical image that facilitates improved ease of image annotation via curved planar reformation in accordance with one or more embodiments described herein.

FIG. 8 illustrates a block diagram of an example, non-limiting system 800 including an annotated and straightened medical image that can facilitate improved ease of image annotation via curved planar reformation in accordance with one or more embodiments described herein. As shown, the system 800 can, in some cases, comprise the same components as the system 500, and can further comprise a 3D medical image 802 depicting an annotation 804.

In various embodiments, the annotation component 118 can electronically generate the 3D medical image 802, based on the 3D medical image 502. More specifically, the annotation component 118 can electronically insert the annotation 804 into the 3D medical image 502, and the result of such insertion can be considered as the 3D medical image 802. Various non-limiting aspects are further described with respect to FIG. 9.

Figure 9:
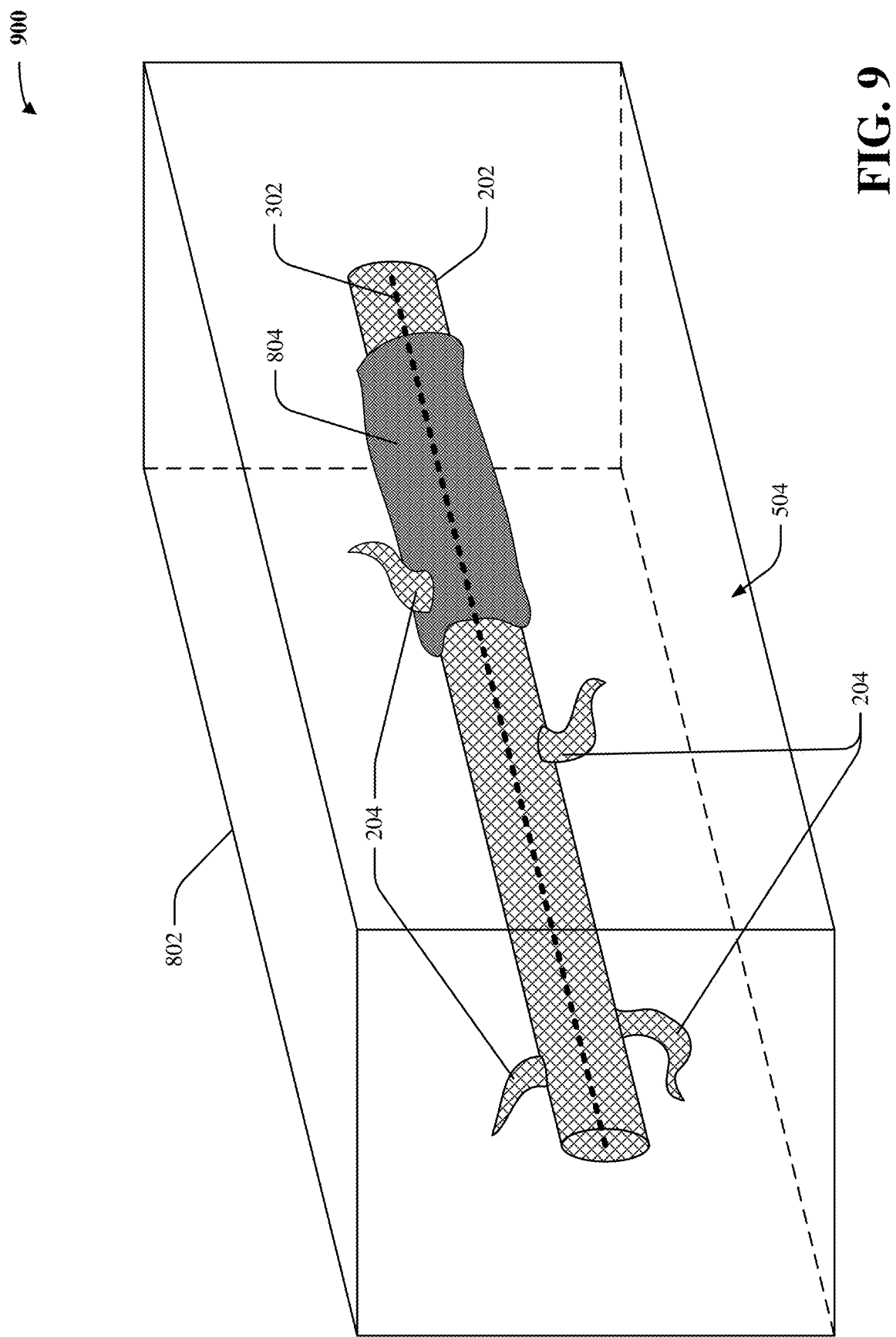
FIG. 9 illustrates an example, non-limiting block diagram showing an annotated and straightened tubular anatomical structure in accordance with one or more embodiments described herein.

FIG. 9 illustrates an example, non-limiting block diagram 900 showing an annotated and straightened tubular anatomical structure in accordance with one or more embodiments described herein. That is, FIG. 9 depicts a non-limiting example of the 3D medical image 802 and of the annotation 804.

In various embodiments, as shown, the 3D medical image 802 can depict the straightened anatomical structure 504. However, as also shown, the 3D medical image 802 can further depict the annotation 804. In other words, the 3D medical image 802 can be considered as being an annotated version of the 3D medical image 502. Accordingly, the 3D medical image 802 can have the same format or size (e.g., the same number of voxel rows, voxel columns, and voxel layers) as the 3D medical image 502. As a non-limiting example, if the 3D medical image 502 is an x'-by-y'-by-z' array of voxels, then the 3D medical image 802 can likewise be an x'-by-y'-by-z' array of voxels.

In any case, the annotation 804 can be any suitable electronic data that can be inserted into the 3D medical image 502 (e.g., that can be superimposed over one or more voxels of the 3D medical image 502) by any suitable user-controlled image editing software. As a non-limiting example, the annotation 804 can be a boundary marker created by a contour tool of the user-controlled image editing software (e.g., can be a line, curve, or surface demarcating a boundary between materials or structures of interest). In such case, the annotation 804 can be considered as denoting a boundary of interest pertaining to the straightened anatomical structure 504. As another non-limiting example, the annotation 804 can be a voxel class created by a brush tool of the user-controlled image editing software (e.g., can be a voxel-wise classification label). In such case, the annotation 804 can be considered as indicating which voxels of the straightened anatomical structure 504 belong to a class of interest (e.g., a calcification class, a blood clot class).

In various aspects, a medical professional or technician can utilize any suitable human-computer interface device (not shown) to trace a brush tool or contour tool of the user-controlled image editing software over, along, around, about, or near the straightened anatomical structure 504, and such tracing can create the annotation 804. The annotation component 118 can accordingly insert the annotation 804 into the 3D medical image 502 (e.g., can superimpose the annotation 804 over the voxels that were indicated by such tracing). Some non-limiting examples of the human-computer interface device can include a touchscreen, a joystick, a keyboard, a keypad, or a computer mouse.

In any case, the annotation component 118 can insert the annotation 804 into the 3D medical image 502, and the result can be considered as the 3D medical image 802.

In various aspects, the annotation component 118 can utilize or otherwise leverage three-dimensional interpolation or three-dimensional extrapolation when applying the annotation 804 to the 3D medical image 502. In particular, the annotation component 118 can insert the annotation 804 into any suitable two-dimensional slice of the 3D medical image 502 (e.g., the medical professional or technician can trace the brush tool or contour tool over various pixels shown in such two-dimensional slice), and the annotation component 118 can extend or otherwise propagate the annotation 804 to other two-dimensional slices of the 3D medical image 502 via three-dimensional interpolation or extrapolation. As a non-limiting example, the annotation component 118 can insert the annotation 804 into an axial slice of the 3D medical image 502. In such case, the annotation component 118 can extend or propagate the annotation 804 into a neighboring axial slice via three-dimensional interpolation or extrapolation (e.g., such that the extended or propagated portion of the annotation 804 can be influenced or otherwise adjusted by the pixel values of the neighboring axial slice). As another non-limiting example, the annotation component 118 can insert the annotation 804 into a longitudinal slice of the 3D medical image 502. In such case, the annotation component 118 can extend or propagate the annotation 804 into a neighboring longitudinal slice via three-dimensional interpolation or extrapolation (e.g., such that the extended or propagated portion of the annotation 804 can be influenced or otherwise adjusted by the pixel values of the neighboring longitudinal slice).

In various instances, three-dimensional interpolation or extrapolation can be performed analytically. As a non-limiting example, three-dimensional interpolation or extrapolation can be implemented via contour tracking. In various other instances, three-dimensional interpolation or extrapolation can be performed via artificial intelligence. As a non-limiting example, a machine learning model (e.g., a deep learning neural network) can be pre-trained (e.g., in supervised fashion, in unsupervised fashion, or via reinforcement learning) to propagate a boundary marker or a voxel class from one two-dimensional slice of a three-dimensional image to another two-dimensional slice. Indeed, contour tracking and artificial-intelligence-based interpolation or extrapolation techniques have been successfully implemented to automatically propagate bounding boxes across two-dimensional frames of a video file. Such contour tracking and artificial-intelligence-based interpolation or extrapolation techniques can likewise be implemented to automatically propagate a boundary marker or a voxel class across two-dimensional slices of a three-dimensional voxel array.

In any case, the annotation component 118 can electronically insert the annotation 804 into the 3D medical image 502, thereby yielding the 3D medical image 802.

Figure 10:
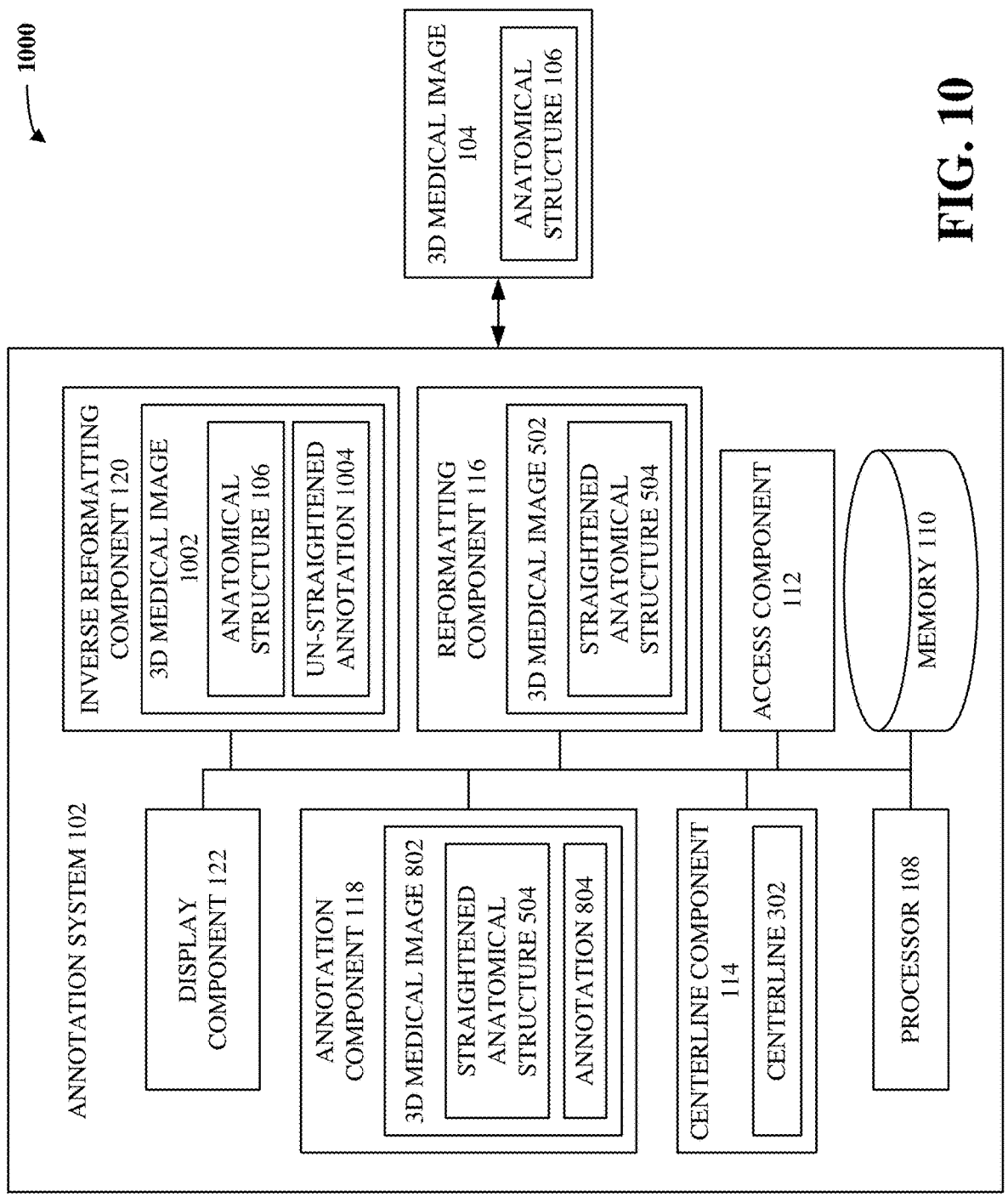
FIG. 10 illustrates a block diagram of an example, non-limiting system including an annotated and un-straightened medical image that facilitates improved ease of image annotation via curved planar reformation in accordance with one or more embodiments described herein.

FIG. 10 illustrates a block diagram of an example, non-limiting system 1000 including an annotated and un-straightened medical image that can facilitate improved ease of image annotation via curved planar reformation in accordance with one or more embodiments described herein. As shown, the system 1000 can, in some cases, comprise the same components as the system 800, and can further comprise a 3D medical image 1002 depicting the anatomical structure 106 and an un-straightened annotation 1004.

In various embodiments, the inverse reformatting component 120 can electronically generate the 3D medical image 1002, based on the 3D medical image 802 and based on the centerline 302. More specifically, the inverse reformatting component 120 can electronically un-straighten the 3D medical image 802 about the centerline 302, and the result of such un-straightening can be considered as the 3D medical image 1002. Various non-limiting aspects are further described with respect to FIGS. 11-12.

Figure 11:
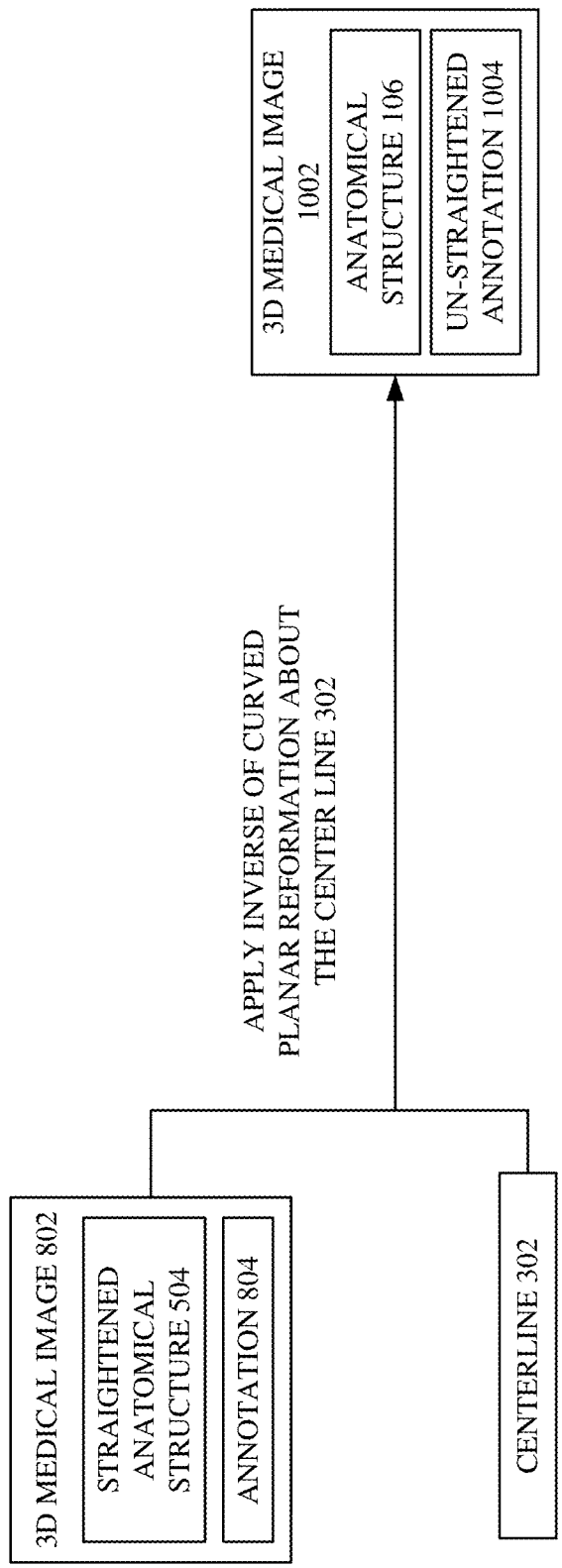
FIG. 11 illustrates an example, non-limiting block diagram showing how an annotated and straightened medical image can be un-straightened in accordance with one or more embodiments described herein.

FIG. 11 illustrates an example, non-limiting block diagram 1100 showing how the 3D medical image 802 can be un-straightened in accordance with one or more embodiments described herein.

In various embodiments, as shown, the inverse reformatting component 120 can generate the 3D medical image 1002, by applying an inverse of CPR to the 3D medical image 802, where such inverse of CPR can be based on the centerline 302.

More specifically, CPR, as mentioned above, can be considered as a bijective transformation for spatially reformatting, rearranging, or otherwise reorganizing the voxels of a medical image, so that the medical image can appear to have been straightened about some reference curve. Because CPR can be bijective (e.g., one-to-one), CPR can be considered as invertible or reversible. Accordingly, CPR can be applied to straighten a medical image about a reference curve, and an inverse of CPR can be applied to reverse such straightening (e.g., to un-straighten a straightened medical image about a reference curve). In other words, an inverse of CPR can be considered as undoing whatever voxel rearrangement or reorganization was accomplished by CPR.

Now, as mentioned above, the 3D medical image 802 can depict the straightened anatomical structure 504 instead of the anatomical structure 106. In other words, the 3D medical image 802 can be considered as being straightened about the centerline 302. Accordingly, when the inverse reformatting component 120 applies an inverse of CPR to the 3D medical image 802, the inverse reformatting component 120 can be considered as un-straightening the 3D medical image 802 about the centerline 302. That is, the inverse reformatting component 120 can be considered as spatially reformatting, rearranging, or reorganizing the voxels of the 3D medical image 802, such that the centerline 302 is no longer straight and is instead once again meandering or winding (e.g., once again exhibits its original twists, turns, coils, or loops). Such spatial reformatting, rearranging, or reorganizing of the voxels of the 3D medical image 802 can commensurately cause the straightened anatomical structure 504 to no longer be straight and to instead be in its original meandering or winding layout. That is, application of an inverse of CPR can convert the straightened anatomical structure 504 back to the anatomical structure 106. Accordingly, application of an inverse of CPR to the 3D medical image 802 about the centerline 302 can be considered as yielding an un-straightened version of the 3D medical image 802, which un-straightened version of the 3D medical image 802 can depict the anatomical structure 106. In various cases, such un-straightened version of the 3D medical image 802 can be referred to as the 3D medical image 1002.

Furthermore, because the 3D medical image 802 can visually depict or otherwise include the annotation 804, application of an inverse of CPR to the 3D medical image 802 can spatially rearrange or reorganize not only whatever voxels that are associated with the straightened anatomical structure 504, but can also spatially rearrange or reorganize whatever voxels that are associated with the annotation 804. Accordingly, application of an inverse of CPR to the 3D medical image 802 can un-straighten not only the straightened anatomical structure 504, but can also un-straighten the annotation 804. In other words, application of an inverse of CPR to the 3D medical image 802 can yield an un-straightened version of the annotation 804. In various cases, such un-straightened version of the annotation 804 can be referred as the un-straightened annotation 1004. Various non-limiting aspects are described with respect to FIG. 12.

Figure 12:
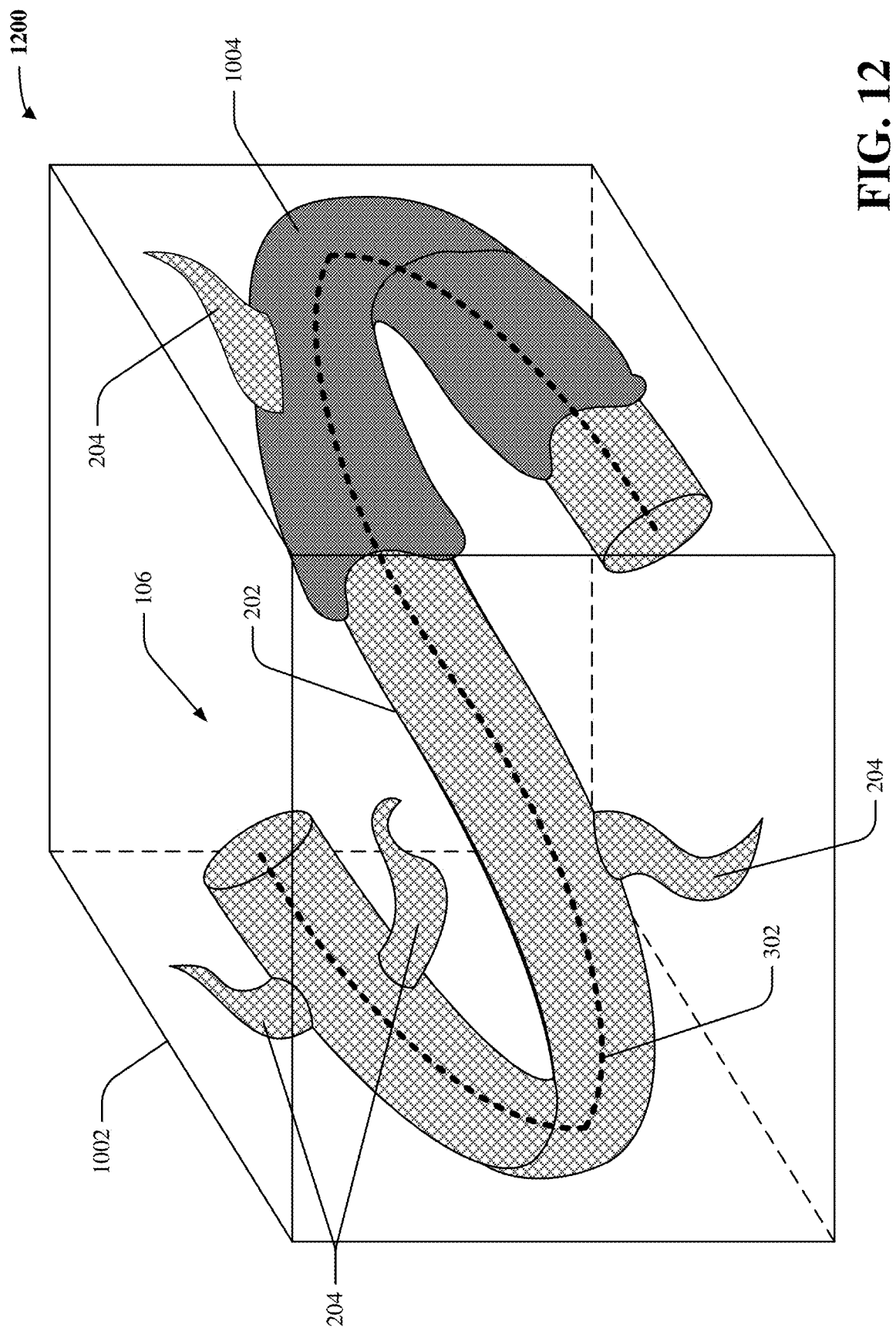
FIG. 12 illustrates an example, non-limiting block diagram showing an annotated and un-straightened tubular anatomical structure in accordance with one or more embodiments described herein.

FIG. 12 illustrates an example, non-limiting block diagram 1200 showing an annotated and un-straightened tubular anatomical structure in accordance with one or more embodiments described herein. In other words, FIG. 12 depicts a non-limiting example of the 3D medical image 1002 and of the un-straightened annotation 1004.

As can be seen, application of an inverse of CPR can cause the 3D medical image 1002 to illustrate the original, meandering, winding version of the centerline 302, rather than the straightened version of the centerline 302. This can accordingly cause the 3D medical image 1002 to depict the anatomical structure 106 instead of the straightened anatomical structure 504. However, this can also cause the 3D medical image 1002 to depict the un-straightened annotation 1004 instead of the annotation 804. In other words, the inverse reformatting component 120 can undo or reverse whatever image straightening that was facilitated by the reformatting component 116, and such undoing or reversing can affect both the voxels that make up the straightened anatomical structure 504 and the voxels that make up the annotation 804. In still other words, application of an inverse of CPR to the 3D medical image 802 can have caused the voxels of the 3D medical image 802 to have been moved into a new spatial arrangement, which new spatial arrangement can illustrate: the original, meandering, winding version of the centerline 302 instead of the straightened version of the centerline 302; the original, meandering, winding version of the anatomical structure 106 instead of the straightened anatomical structure 504; and the un-straightened annotation 1004 instead of the original version of the annotation 804.

Note that, because CPR is bijective, the un-straightened annotation 1004 can be considered as having the same relative position or orientation with respect to the anatomical structure 106 as the annotation 804 has with respect to the straightened anatomical structure 504.

Moreover, note that, because an inverse of CPR can be considered as undoing or reversing whatever voxel rearrangement or reorganization was accomplished by CPR, the 3D medical image 1002 can have the same size or format as the 3D medical image 104. As a non-limiting, and as mentioned above, the 3D medical image 104 can be an x-by-y-by-z array of voxels, whereas the 3D medical image 502 and the 3D medical image 802 can both be x'-by-y'-by-z' arrays of voxels. In such case, the 3D medical image 1002 can be an x-by-y-by-z array of voxels instead of an x'-by-y'-by-z' array of voxels.

In various aspects, the 3D medical image 1002 can be considered as an annotated version of the 3D medical image 104. After all, the 3D medical image 1002 can have the same size or format as the 3D medical image 104; the 3D medical image 1002 can depict the original, meandering, winding version of the anatomical structure 106 just like the 3D medical image 104; and the 3D medical image 1002 can include the un-straightened annotation 1004.

Note that, in various aspects, it can be considered as less difficult to create the 3D medical image 1002 as described herein, as compared to instead directly annotating the 3D medical image 104. Indeed, directly annotating the 3D medical image 104 would involve the medical professional or technician tracing a brush tool or contour tool of the user-controlled image editing software over, along, around, about, or near the original, meandering, winding version of the anatomical structure 106. Because the original, meandering, winding version of the anatomical structure 106 can exhibit various twists, turns, coils, or loops, such tracing would have been excessively time-consuming, effort-intensive, or painstaking. In stark contrast and as described herein, it can be much less time-consuming, effort-intensive, or painstaking for the medical professional or technician to trace the brush tool or contour tool of the user-controlled image editing software over, along, around, about, or near the straightened anatomical structure 504, since the straightened anatomical structure 504 can be non-meandering or non-winding (e.g., can lack the twists, turns, coils, or loops exhibited by the anatomical structure 106). In other words, creating an annotated version of a given medical image can be considered as easier (e.g., can require less time, less effort) when that given medical image is first straightened, then annotated, and then un-straightened about a centerline of an anatomical structure of interest, as opposed to annotating the given medical image directly.

In various embodiments, the display component 122 can electronically render, on any suitable electronic display (e.g., on any suitable computer screen, computer monitor, or graphical user-interface), the 3D medical image 1002 or any suitable two-dimensional slice or projection thereof. Likewise, in various aspects, the display component 122 can electronically render, on any suitable electronic display, the 3D medical image 802 or any suitable two-dimensional slice or projection thereof. In some instances, the display component 122 can electronically transmit the 3D medical image 1002 or any suitable two-dimensional slice or projection thereof to any other suitable computing device. Similarly, in some cases, the display component 122 can electronically transmit the 3D medical image 802 or any suitable two-dimensional slice or projection thereof to any other suitable computing device.

In any case, the 3D medical image 1002 can be considered as an annotated version of the 3D medical image 104. Accordingly, the 3D medical image 1002 can, in various aspects, be treated as a ground-truth that is known or deemed to correspond to the 3D medical image 104, and such ground-truth can be implemented for training any suitable machine learning model (not shown). In some aspects, the annotation system 102 can actually train such machine learning model using the 3D medical image 104 and the 3D medical image 1002. As a non-limiting example, the annotation system 102 can: execute the machine learning model on the 3D medical image 104, thereby causing the machine learning model to produce some output; compute an error or loss between that output and the 3D medical image 1002; and update (e.g., via backpropagation) trainable internal parameters (e.g., convolutional kernels, weights, biases) of the machine learning model based on such error or loss.

Figure 13:
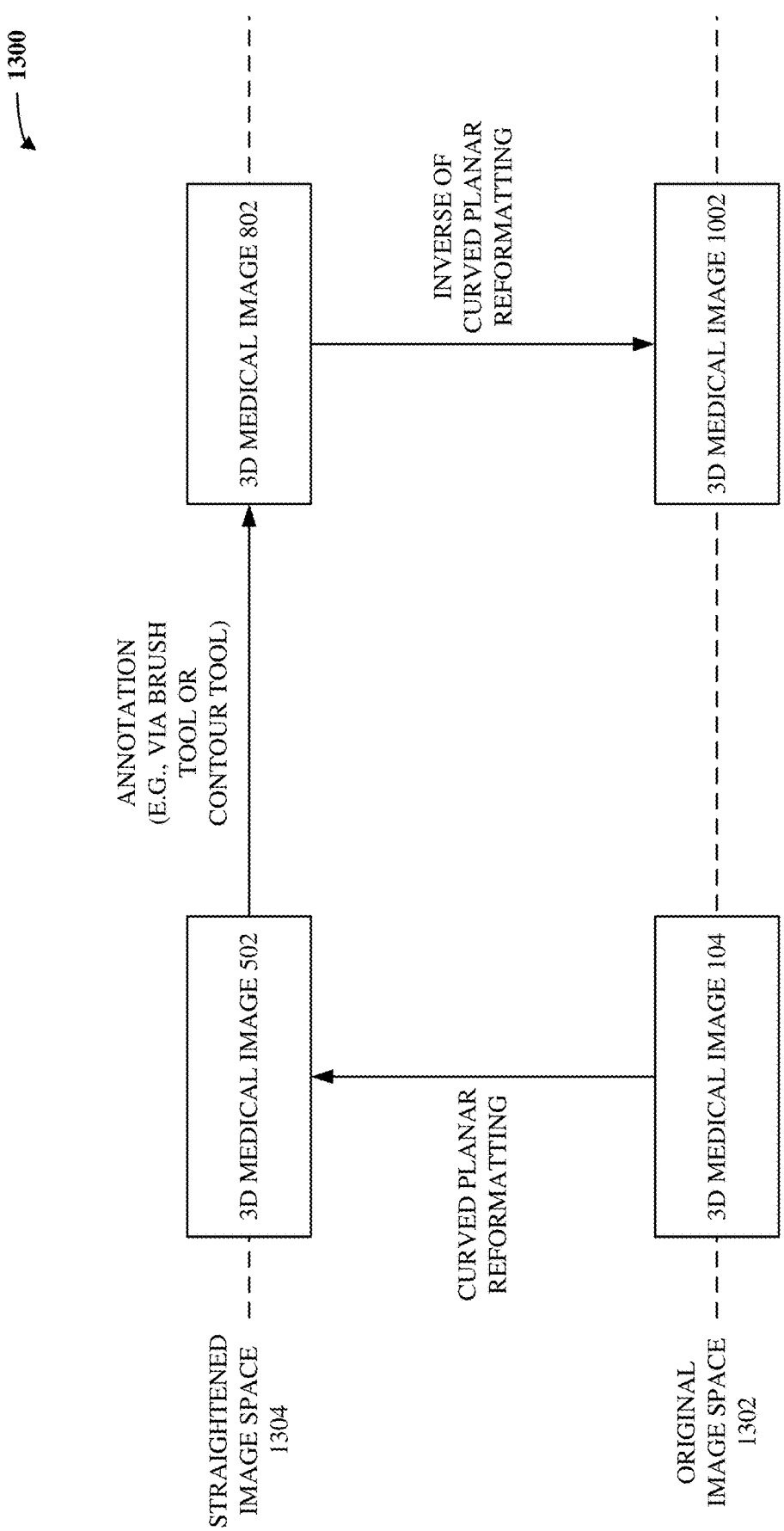
FIG. 13 illustrates an example, non-limiting block diagram showing how a medical image can be annotated by being imported into a straightened image space in accordance with one or more embodiments described herein.

FIG. 13 illustrates an example, non-limiting block diagram 1300 showing how a medical image can be annotated by being imported into a straightened image space in accordance with one or more embodiments described herein.

In various aspects, the 3D medical image 104 can be considered as occupying an original image space 1302. In various instances, the original image space 1302 can be considered as being whatever three-dimensional coordinate system or voxel layout is exhibited by the 3D medical image 104. Note that the centerline 302, and thus the anatomical structure 106, can be meandering or winding when visually represented in the original image space 1302.

In various aspects, application of CPR based on the centerline 302 can be considered as importing or otherwise converting the 3D medical image 104 from the original image space 1302 to a straightened image space 1304. In various instances, the straightened image space 1304 can be considered as being whatever three-dimensional coordinate system or voxel layout is achieved by straightening the original image space 1302 about the centerline 302. Accordingly, when visually represented in the straightened image space 1304, the centerline 302, and thus the anatomical structure 106, can no longer be meandering or winding. Rather, when visually represented in the straightened image space 1304, the centerline 302, and thus the anatomical structure 106, can instead be straight (e.g., non-twisting, non-turning, non-coiling, non-looping). In various cases, the 3D medical image 502 can be considered as being the result of importing the 3D medical image 104 into the straightened image space 1304. Accordingly, the straightened anatomical structure 504 can be considered representing how the anatomical structure 106 looks when imported into the straightened image space 1304.

In various aspects, annotation can occur in the straightened image space 1304, rather than in the original image space 1302. In other words, the annotation 804 can be inserted into or otherwise applied (e.g., via a brush tool or a contour tool, via three-dimensional interpolation or extrapolation) to the 3D medical image 502, not to the 3D medical image 104. In various cases, the 3D medical image 802 can be considered as being the result of annotating the 3D medical image 502 in the straightened image space 1304.

In various instances, application of an inverse of CPR based on the centerline 302 can be considered as importing or otherwise converting the 3D medical image 802 from the straightened image space 1304 back to the original image space 1302. As mentioned above, the centerline 302, and thus the anatomical structure 106, can be meandering or winding, rather than straight, when visually represented in the original image space 1302. Likewise, the annotation 804 can take on a meandering, winding, or otherwise un-straightened layout when visually represented in the original image space 1302. In various cases, the 3D medical image 1002 can be considered as being the result of importing the 3D medical image 802 back into the original image space 1302. Accordingly, the un-straightened annotation 1004 can be considered representing how the annotation 804 looks when imported into the original image space 1302.

As mentioned above, it can be much less difficult to create the annotation 804 via brush tools or contour tools in the straightened image space 1304, as opposed to instead creating the un-straightened annotation 1004 via brush tools or contour tools in the original image space 1302. After all, it can require less time or less concentration to trace a brush tool or contour tool in the straightened image space 1304, since the straightened anatomical structure 504 can lack twists, turns, coils, or loops. In stark contrast, it can require more time or more concentration to trace a brush tool or contour tool in the original image space 1302, since the anatomical structure 106 can exhibit various twists, turns, coils, or loops. Thus, by first straightening, subsequently annotating, and lastly un-straightening the 3D medical image 104, an ease of annotation can be increased.

Figure 14:
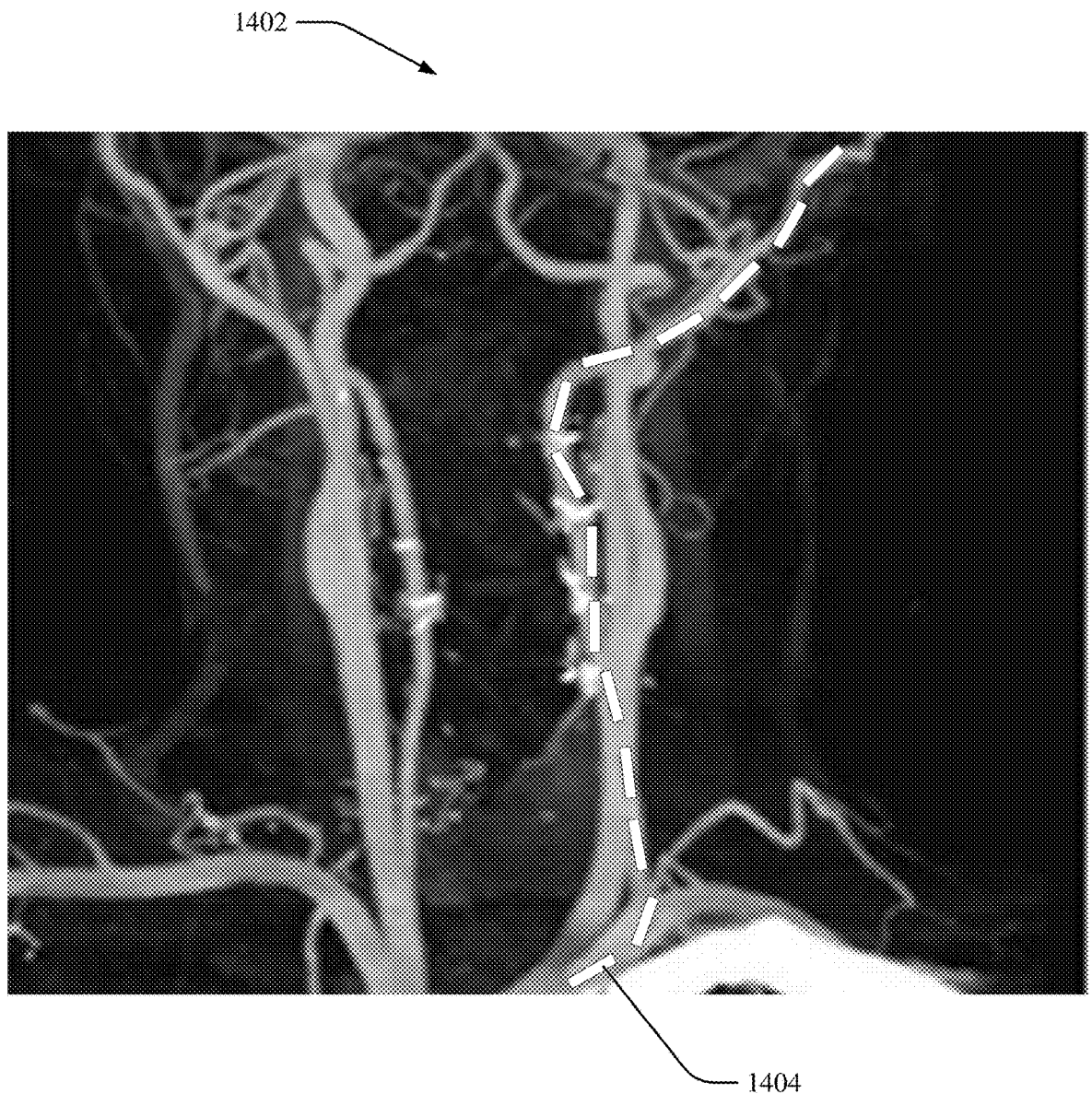
FIGS. 14-16 illustrate example, non-limiting experimental results in accordance with one or more embodiments described herein.
Figure 15:
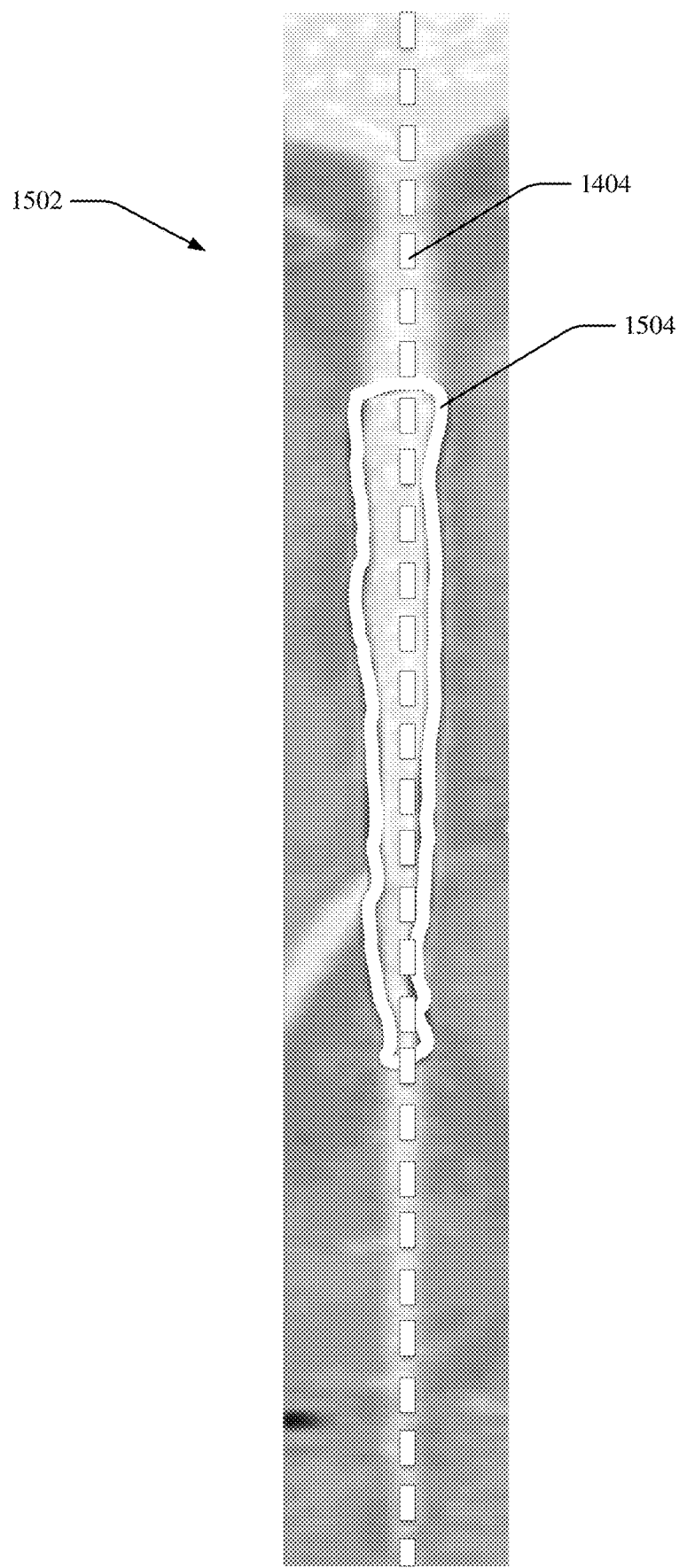
Figure 16:
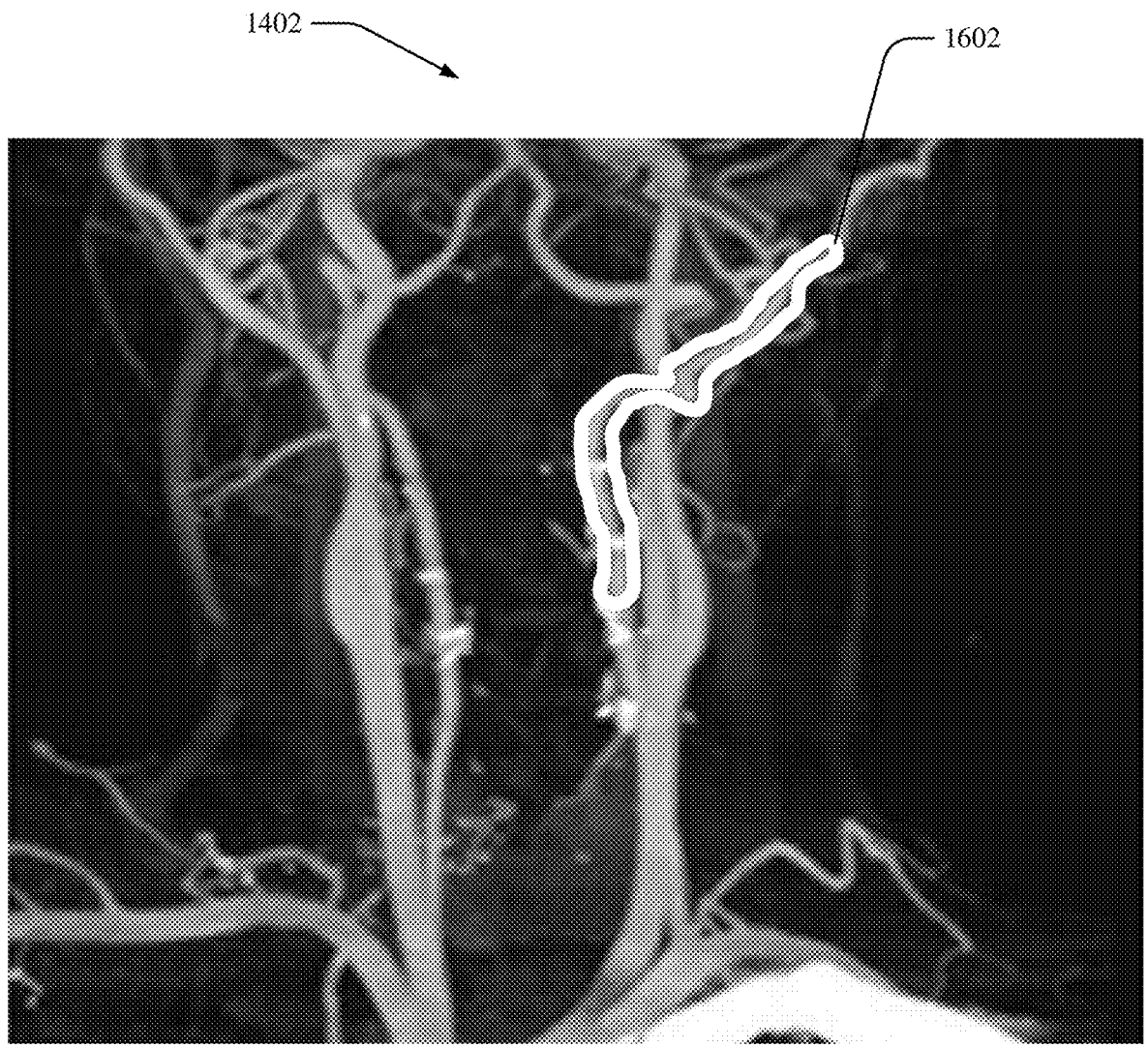

FIGS. 14-16 illustrate example, non-limiting experimental results in accordance with one or more embodiments described herein.

First, consider FIG. 14. As shown, FIG. 14 depicts a two-dimensional slice of a CT scanned image 1402 depicting various blood vessels of a medical patient. A non-limiting example embodiment of the centerline component 114 was executed on the CT scanned image 1402, thereby localizing a centerline 1404 of a particular blood vessel of interest. As can be seen, the centerline 1404 can be considered as meandering, winding, twisting, or turning.

Now, consider FIG. 15. A non-limiting example embodiment of the reformatting component 116 was executed on the CT scanned image 1402 based on the centerline 1404. This yielded a straightened CT image 1502, a two-dimensional slice of which is shown in FIG. 15. As can be seen, the centerline 1404 can now be considered as straight (e.g., non-meandering, non-winding, non-twisting, non-turning). As can also be seen, an annotation 1504 was inserted into the straightened CT image 1502 by a non-limiting example embodiment of the annotation component 118. More specifically, a medical professional or technician can have used a brush tool or contour tool to trace the annotation 1504 around a boundary of the straightened version of the blood vessel of interest, and the non-limiting example embodiment of the annotation component 118 can have inserted the annotation 1504 into the straightened CT image 1502 (e.g., can have superimposed the annotation 1504 over the voxels of the straightened CT image 1502).

Now, consider FIG. 16. After application of the annotation 1504, a non-limiting example embodiment of the inverse reformatting component 120 was executed on the straightened CT image 1502 based on the centerline 1404. This converted the straightened CT image 1502 back to the CT scanned image 1402. However, as shown, this further converted the annotation 1504 into an un-straightened annotation 1602. Note that, although the un-straightened annotation 1602 is meandering or winding unlike the annotation 1504, the un-straightened annotation 1602 can nevertheless be considered as having the same relative position or orientation with respect to the blood vessel of interest depicted in the CT scanned image 1402, as the annotation 1504 had with respect to the straightened version of the blood vessel of interest depicted in the straightened CT image 1502. In other words, the un-straightened annotation 1602 can be considered as demarcating a meandering or winding boundary of the blood vessel of interest, just as the annotation 1504 can be considered as demarcating a straightened boundary of the blood vessel of interest.

Note that, because the centerline 1404 and thus the blood vessel of interest are straight in the straightened CT image 1502, tracing a brush tool or contour tool about or around the blood vessel of interest in the straightened CT image 1502 to create the annotation 1504 can be considered as being not difficult or time-consuming. In stark contrast, because the centerline 1404 and thus the blood vessel of interest are meandering or winding in the CT scanned image 1402, it would have been much more difficult or time-consuming to trace the brush tool or contour tool about or around the blood vessel of interest in the CT scanned image 1402. Again, this helps to demonstrate benefits achieved by various embodiments described herein (e.g., achieved by first straightening, then annotating, and finally un-straightening a medical image).

Figure 17:
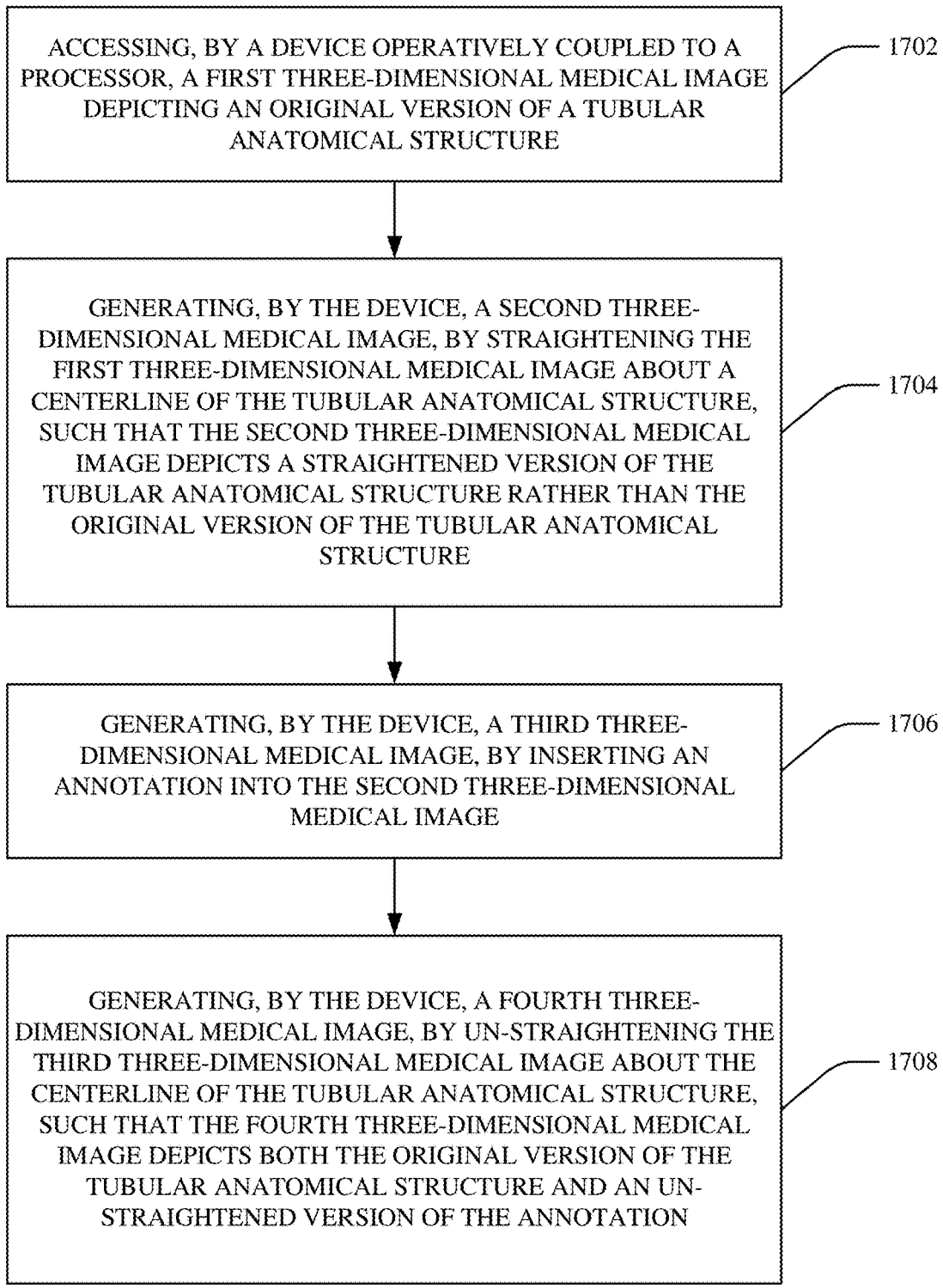
FIG. 17 illustrates a flow diagram of an example, non-limiting computer-implemented method that facilitates improved ease of image annotation via curved planar reformation in accordance with one or more embodiments described herein.

FIG. 17 illustrates a flow diagram of an example, non-limiting computer-implemented method 1700 that can facilitate improved ease of image annotation via curved planar reformation in accordance with one or more embodiments described herein. In various cases, the annotation system 102 can facilitate the computer-implemented method 1700.

In various embodiments, act 1702 can include accessing, by a device (e.g., via 112) operatively coupled to a processor (e.g., 108), a first three-dimensional medical image (e.g., 104) depicting an original version of a tubular anatomical structure (e.g., 106).

In various aspects, act 1704 can include generating, by the device (e.g., via 116), a second three-dimensional medical image (e.g., 502), by straightening the first three-dimensional medical image about a centerline (e.g., 302) of the tubular anatomical structure, such that the second three-dimensional medical image can depict a straightened version (e.g., 504) of the tubular anatomical structure rather than the original version of the tubular anatomical structure.

In various instances, act 1706 can include generating, by the device (e.g., via 118), a third three-dimensional medical image (e.g., 802), by inserting an annotation (e.g., 804) into the second three-dimensional medical image, such that the third three-dimensional medical image can depict the annotation and the straightened version of the tubular anatomical structure.

In various cases, act 1708 can include generating, by the device (e.g., via 120), a fourth three-dimensional medical image (e.g., 1002), by un-straightening the third three-dimensional medical image about the centerline of the tubular anatomical structure, such that the fourth three-dimensional medical image can depict both the original version of the tubular anatomical structure (e.g., 106) and an un-straightened version (e.g., 1004) of the annotation.

Although not explicitly shown in FIG. 17, the computer-implemented method 1700 can comprise: localizing, by the device (e.g., via 114), the centerline of the tubular anatomical structure. In various instances, the localizing the centerline can be based on execution of a deep learning neural network, on execution of a CEASAR algorithm, or on execution of a Dijkstra algorithm.

Although not explicitly shown in FIG. 17, the device can straighten the first three-dimensional medical image via curved planar reformation, and the device can un-straighten the third three-dimensional medical image via an inverse of the curved planar reformation.

Although not explicitly shown in FIG. 17, the annotation can be a boundary marker or a voxel class produced by a user-controlled brush tool or by a user-controlled contour tool.

Although not explicitly shown in FIG. 17, the device can insert the annotation into a first slice of the second three-dimensional medical image, and the computer-implemented method 1700 can further comprise: interpolating or extrapolating, by the device (e.g., via 118), the annotation to a second slice of the second three-dimensional medical image.

Although not explicitly shown in FIG. 17, the tubular anatomical structure can be a lumen, intestine, blood vessel, or nerve fiber.

Although not explicitly shown in FIG. 17, the computer-implemented method 1700 can comprise: rendering, by the device (e.g., via 122), the third three-dimensional medical image or the fourth three-dimensional medical image on an electronic display.

Various embodiments described herein can include a computer program product for facilitating improved ease of image annotation via curved planar reformation. In various aspects, the computer program product can comprise a non-transitory computer-readable memory (e.g., 110) having program instructions embodied therewith. In various instances, the program instructions can be executable by a processor (e.g., 108) to cause the processor to: access a medical image (e.g., 104) depicting a curved anatomical structure (e.g., 106); localize a centerline (e.g., 302) of the curved anatomical structure; import the medical image from an original image space (e.g., 1302) to a straightened image space (e.g., 1304), by applying curved planar reformation based on the localized centerline; apply an annotation (e.g., 804) to the medical image in the straightened image space (e.g., to 502); import the medical image and the annotation (e.g., import 802) from the straightened image space to the original image space, by applying an inverse of the curved planar reformation; and render the medical image and the annotation in the original image space (e.g., render 1002) on an electronic display.

In various aspects, the processor can localize the centerline via execution of a deep learning neural network, via execution of a CEASAR algorithm, or via execution of a Dijkstra algorithm.

In various instances, the processor can apply the annotation to the medical image by inserting a boundary marker or a voxel class specified by a user-controlled brush tool or by a user-controlled contour tool.

In various cases, the processor can apply the annotation via three-dimensional interpolation.

Although the herein disclosure mainly describes various embodiments as applying annotations (e.g., 804) to straightened medical images (e.g., 502), this is a mere non-limiting example. In various aspects, any other suitable tasks can be performed on straightened medical images. As a non-limiting example, measurements of anatomical structures (e.g., of diameters of anatomical structures, of wall thicknesses of anatomical structures) can be performed on straightened medical images. In other words, it can be easier to perform such measurements in a straightened image space (e.g., 1304) rather than in an original image space (e.g., 1302).

Moreover, although the herein disclosure mainly describes various embodiments as applying to medical images (e.g., 104), this is a mere non-limiting example. Various embodiments described herein can be implemented to increase ease of image annotation with respect to any suitable type of images (e.g., with respect to non-medical images) that depict tubular, meandering, or winding structures or objects.

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 18:
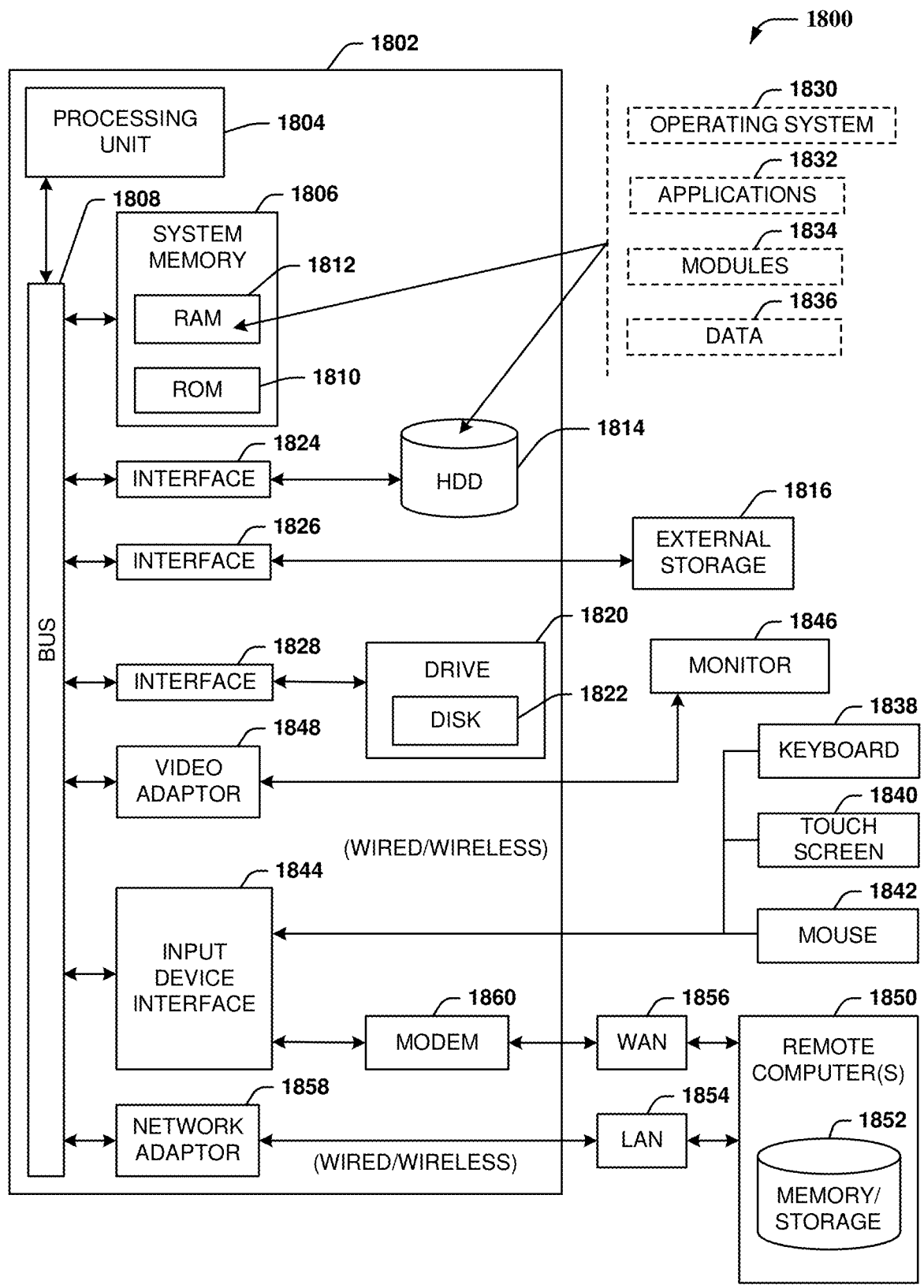
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi-processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 19:
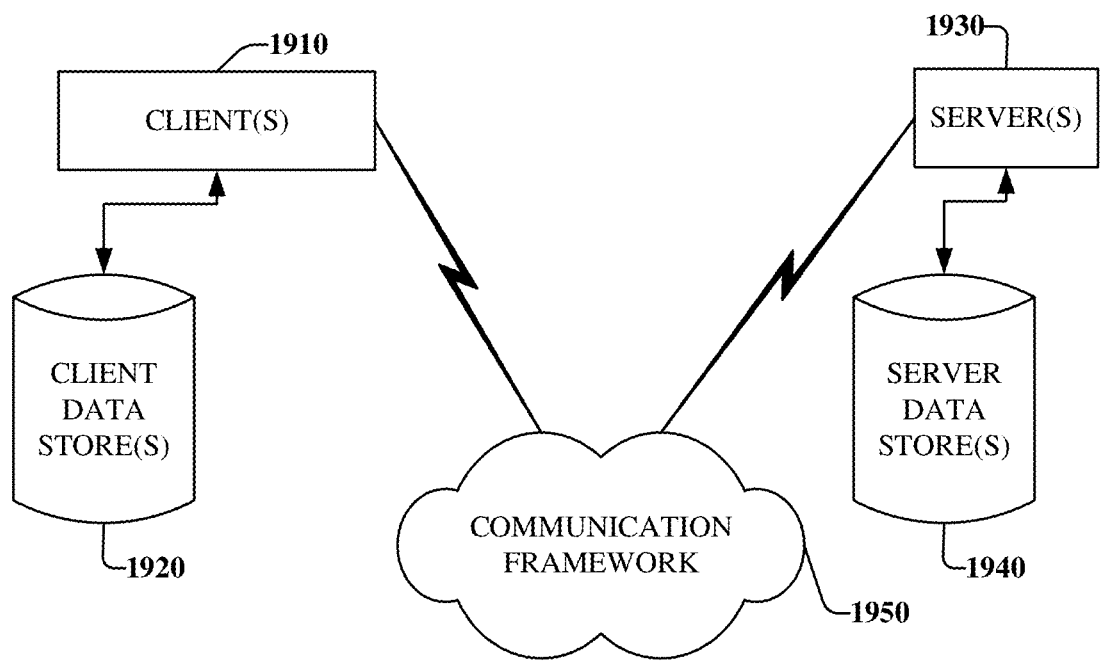
FIG. 19 illustrates an example networking environment operable to execute various implementations described herein.

FIG. 19 is a schematic block diagram of a sample computing environment 1900 with which the disclosed subject matter can interact. The sample computing environment 1900 includes one or more client(s) 1910. The client(s) 1910 can be hardware or software (e.g., threads, processes, computing devices). The sample computing environment 1900 also includes one or more server(s) 1930. The server(s) 1930 can also be hardware or software (e.g., threads, processes, computing devices). The servers 1930 can house threads to perform transformations by employing one or more embodiments as described herein, for example. One possible communication between a client 1910 and a server 1930 can be in the form of a data packet adapted to be transmitted between two or more computer processes. The sample computing environment 1900 includes a communication framework 1950 that can be employed to facilitate communications between the client(s) 1910 and the server(s) 1930. The client(s) 1910 are operably connected to one or more client data store(s) 1920 that can be employed to store information local to the client(s) 1910. Similarly, the server(s) 1930 are operably connected to one or more server data store(s) 1940 that can be employed to store information local to the servers 1930.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory configured to store computer-executable components; and
a processor that executes at least one of the computer-executable components that:
accesses a first three-dimensional medical image depicting an original version of a tubular anatomical structure having a centerline along a radial center of a tubular core of the tubular anatomical structure that follows a non-linear three-dimensional path;
generates a second three-dimensional medical image, by straightening the first three-dimensional medical image about the centerline, such that the second three-dimensional medical image depicts a straightened version of the tubular anatomical structure having the centerline that follows a linear three-dimensional path;
generates a third three-dimensional medical image, by inserting an annotation received via user input into the second three-dimensional medical image, such that the third three-dimensional medical image depicts the annotation and the straightened version of the tubular anatomical structure; and
generates a fourth three-dimensional medical image, by un-straightening the third three-dimensional medical image about the centerline of the tubular anatomical structure, such that the fourth three-dimensional medical image depicts both the original version of the tubular anatomical structure having the centerline that follows the non-linear three-dimensional path and an un-straightened version of the annotation that has been generated based on a transformation of the centerline of the straightened version of the tubular anatomical structure from the linear three-dimensional path to the non-linear three-dimensional path.

2. The system of claim 1, wherein the at least one of the computer-executable components further:
 localizes the centerline of the tubular anatomical structure.

3. The system of claim 2, wherein the at least one of the computer-executable components localizes the centerline via execution of at least one of a deep learning neural network, a CEASAR algorithm, or of a Dijkstra algorithm.

4. The system of claim 1, wherein the at least one of the computer-executable components straightens the first three-dimensional medical image via curved planar reformation, and un-straightens the third three-dimensional medical image via an inverse of the curved planar reformation.

5. The system of claim 1, wherein the annotation is a boundary marker or a voxel class produced by a user-controlled brush tool or by a user-controlled contour tool.

6. The system of claim 1, wherein the at least one of the computer-executable components inserts the annotation into a first slice of the second three-dimensional medical image, and interpolates or extrapolates the annotation to a second slice of the second three-dimensional medical image.

7. The system of claim 1, wherein the tubular anatomical structure is a lumen, intestine, blood vessel, or nerve fiber.

8. The system of claim 1, wherein the at least one of the computer-executable components further:
 renders the third three-dimensional medical image or the fourth three-dimensional medical image on an electronic display.

9. A computer-implemented method, comprising:
 accessing, by a system operatively coupled to a processor, a first three-dimensional medical image depicting an original version of a tubular anatomical structure having a centerline along a radial center of a tubular core of the tubular anatomical structure that follows a non-linear three-dimensional path;
 generating, by the system, generates a second three-dimensional medical image, by straightening the first three-dimensional medical image about the centerline, such that the second three-dimensional medical image depicts a straightened version of the tubular anatomical structure having the centerline that follows a linear three-dimensional path;
 generating, by the system, a third three-dimensional medical image, by inserting an annotation received via user input into the second three-dimensional medical image, such that the third three-dimensional medical image depicts the annotation and the straightened version of the tubular anatomical structure; and
 generating, by the system, a fourth three-dimensional medical image, by un-straightening the third three-dimensional medical image about the centerline of the tubular anatomical structure, such that the fourth three-dimensional medical image depicts both the original version of the tubular anatomical structure having the centerline that follows the non-linear three-dimensional path and an un-straightened version of the annotation that has been generated based on a transformation of the centerline of the straightened version of the tubular anatomical structure from the linear three-dimensional path to the non-linear three-dimensional path.

10. The computer-implemented method of claim 9, further comprising:
 localizing, by the system, the centerline of the tubular anatomical structure.

11. The computer-implemented method of claim 10, wherein the localizing the centerline is based on execution of at least one of a deep learning neural network, a CEASAR algorithm, or of a Dijkstra algorithm.

12. The computer-implemented method of claim 9, wherein the system straightens the first three-dimensional medical image via curved planar reformation, and wherein the system un-straightens the third three-dimensional medical image via an inverse of the curved planar reformation.

13. The computer-implemented method of claim 9, wherein the annotation is a boundary marker or a voxel class produced by a user-controlled brush tool or by a user-controlled contour tool.

14. The computer-implemented method of claim 9, wherein the system inserts the annotation into a first slice of the second three-dimensional medical image, and further comprising:
 interpolating or extrapolating, by the system, the annotation to a second slice of the second three-dimensional medical image.

15. The computer-implemented method of claim 9, wherein the tubular anatomical structure is a lumen, intestine, blood vessel, or nerve fiber.

16. The computer-implemented method of claim 9, further comprising:
 rendering, by the system, the third three-dimensional medical image or the fourth three-dimensional medical image on an electronic display.

17. A computer program product for facilitating improved ease of image annotation via curved planar reformation, the computer program product comprising a non-transitory computer-readable memory having program instructions embodied therewith, the program instructions executable by a processor to cause the processor to:
 access a medical image depicting an original version of a tubular anatomical structure having a centerline along a radial center of a tubular core of the tubular anatomical structure that follows a non-linear three-dimensional path;
 localize the centerline of the tubular anatomical structure;
 import the medical image from an original image space to a straightened image space, by applying the curved planar reformation based on the centerline, such that the straightened image space depicts a straightened medical image comprising a straightened version of the tubular anatomical structure having the centerline that follows a linear three-dimensional path;
 apply an annotation received via user input to the straightened medical image in the straightened image space;
 import the straightened medical image and the annotation from the straightened image space to the original image space, by applying an inverse of the curved planar reformation, such that the original image space comprises an annotated medical image that depicts both the original version of the tubular anatomical structure having the centerline that follows the non-linear three-dimensional path and an un-straightened version of the annotation that has been generated based on a transformation of the centerline of the straightened version of the tubular anatomical structure from the linear three-dimensional path to the non-linear three-dimensional path; and
 render the annotated medical image and the un-straightened version of the annotation in the original image space on an electronic display.

18. The computer program product of claim 17, wherein the processor localizes the centerline via execution of at least one of a deep learning neural network, a CEASAR algorithm, or of a Dijkstra algorithm.

19. The computer program product of claim 17, wherein the processor applies the annotation to the medical image by inserting a boundary marker or a voxel class specified by a user-controlled brush tool or by a user-controlled contour tool.

20. The computer program product of claim 17, wherein the processor applies the annotation via three-dimensional interpolation.

* * * * *